US006938263B2

(12) United States Patent
Wollrath et al.

(10) Patent No.: US 6,938,263 B2
(45) Date of Patent: *Aug. 30, 2005

(54) SYSTEM AND METHOD FOR FACILITATING DYNAMIC LOADING OF "STUB" INFORMATION TO ENABLE A PROGRAM OPERATING IN ONE ADDRESS SPACE TO INVOKE PROCESSING OF A REMOTE METHOD OR PROCEDURE IN ANOTHER ADDRESS SPACE

(75) Inventors: Ann M. Wollrath, Groton, MA (US); James H. Waldo, Dracut, MA (US); Roger Riggs, Burlington, MA (US)

(73) Assignee: Sun Microsystems, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/636,706
(22) Filed: Apr. 23, 1996

(65) Prior Publication Data

US 2003/0084204 A1 May 1, 2003

(51) Int. Cl.[7] ................................................. G06F 9/46
(52) U.S. Cl. ..................................................... 719/330
(58) Field of Search ................................. 395/680, 681, 395/682, 683, 684; 709/310–332, 203, 219; 719/330, 331, 332, 315, 316, 310, 328

(56) References Cited

U.S. PATENT DOCUMENTS 4,430,699 A    2/1984  Segarra et al.
4,491,946 A    1/1985  Kryskow, Jr. et al.
4,558,413 A   12/1985  Schmidt et al.

(Continued)

FOREIGN PATENT DOCUMENTS

| EP | 0 300 516 A2 | 1/1989 |
| EP | 0 351 536 A3 | 1/1990 |
| EP | 0 384 339 A3 | 8/1990 |
| EP | 0 472 874 A1 | 3/1992 |

(Continued)

OTHER PUBLICATIONS

Betz, Mark; Interoperable objects: laying the foundation for distributed object computing; Dr. Dobb's Journal, v19, n11,p18(13), Oct. 1994.*

(Continued)

*Primary Examiner*—Sue Lao
(74) *Attorney, Agent, or Firm*—Finnegan, Henderson, Farabow, Garrett & Dunner L.L.P.

(57) ABSTRACT

A stub retrieval and loading subsystem is disclosed for use in connection with a remote method invocation system. The stub retrieval and loading subsystem controls the retrieval and loading of a stub for a remote method, into an execution environment, to facilitate invocation of the remote method by a program executing in the execution environment. The stub retrieval subsystem includes a stub retriever for initiating a retrieval of the stub and stub loader for, when the stub is received by the stub retriever, loading the stub into the execution environment, thereby to make the stub available for use in remote invocation of the remote method. In one embodiment, the stub retrieval and loading subsystem effects the retrieval and loading for a program operating in one address space provided by one computer, of stub class instances to effect the remote invocation of methods which are provided by objects operating in another address space, which may be provided by the same computer or a different computer.

33 Claims, 6 Drawing Sheets

U.S. PATENT DOCUMENTS

| | | | |
|---|---|---|---|
| 4,567,359 A | 1/1986 | Lockwood | |
| 4,713,806 A | 12/1987 | Oberlander et al. | |
| 4,809,160 A | 2/1989 | Mahon et al. | |
| 4,823,122 A | 4/1989 | Mann et al. | |
| 4,939,638 A | 7/1990 | Stephenson et al. | |
| 4,956,773 A | 9/1990 | Saito et al. | |
| 4,992,940 A | 2/1991 | Dworkin | |
| 5,088,036 A | 2/1992 | Ellis et al. | |
| 5,101,346 A | 3/1992 | Ohtsuki | |
| 5,109,486 A | 4/1992 | Seymour | |
| 5,187,787 A | 2/1993 | Skeen et al. | |
| 5,218,699 A * | 6/1993 | Brandle et al. | 395/684 |
| 5,253,165 A | 10/1993 | Leiseca et al. | |
| 5,257,369 A | 10/1993 | Skeen et al. | |
| 5,293,614 A | 3/1994 | Ferguson et al. | |
| 5,297,283 A | 3/1994 | Kelly, Jr. et al. | |
| 5,303,042 A | 4/1994 | Lewis et al. | |
| 5,307,490 A | 4/1994 | Davidson et al. | 395/650 C |
| 5,311,591 A | 5/1994 | Fischer | |
| 5,319,542 A | 6/1994 | King, Jr. et al. | |
| 5,327,559 A | 7/1994 | Priven et al. | |
| 5,331,637 A | 7/1994 | Francis et al. | |
| 5,339,430 A * | 8/1994 | Lundin et al. | 719/332 |
| 5,339,435 A | 8/1994 | Lubkin et al. | |
| 5,386,568 A | 1/1995 | Wold et al. | |
| 5,390,328 A | 2/1995 | Frey et al. | |
| 5,392,280 A | 2/1995 | Zheng | |
| 5,423,042 A | 6/1995 | Jalili et al. | |
| 5,440,744 A | 8/1995 | Jacobson et al. | |
| 5,446,901 A | 8/1995 | Owicki et al. | |
| 5,448,740 A | 9/1995 | Kiri et al. | |
| 5,452,459 A | 9/1995 | Drury et al. | |
| 5,455,952 A | 10/1995 | Gjovaag | |
| 5,459,837 A | 10/1995 | Caccavale | |
| 5,471,629 A | 11/1995 | Risch | |
| 5,475,792 A | 12/1995 | Stanford et al. | |
| 5,475,817 A | 12/1995 | Waldo et al. | |
| 5,475,840 A | 12/1995 | Nelson et al. | |
| 5,481,721 A | 1/1996 | Serlet et al. | |
| 5,504,921 A | 4/1996 | Dev et al. | |
| 5,506,984 A | 4/1996 | Miller | |
| 5,511,196 A | 4/1996 | Shackelford et al. | |
| 5,511,197 A * | 4/1996 | Hill et al. | 709/300 |
| 5,524,244 A | 6/1996 | Robinson et al. | |
| 5,544,040 A | 8/1996 | Gerbaulet | |
| 5,548,724 A | 8/1996 | Akizawa et al. | |
| 5,548,726 A | 8/1996 | Pettus | |
| 5,553,282 A | 9/1996 | Parrish et al. | |
| 5,555,367 A | 9/1996 | Premerlani et al. | |
| 5,555,427 A | 9/1996 | Aoe et al. | |
| 5,557,798 A | 9/1996 | Skeen et al. | |
| 5,560,003 A | 9/1996 | Nilsen et al. | |
| 5,561,785 A | 10/1996 | Blandy et al. | |
| 5,577,231 A | 11/1996 | Scalzi et al. | |
| 5,577,251 A * | 11/1996 | Hamilton et al. | 709/101 |
| 5,592,375 A | 1/1997 | Salmon et al. | |
| 5,594,921 A | 1/1997 | Pettus | |
| 5,603,031 A | 2/1997 | White et al. | |
| 5,617,537 A | 4/1997 | Yamada et al. | |
| 5,628,005 A | 5/1997 | Hurvig | |
| 5,640,564 A | 6/1997 | Hamilton et al. | |
| 5,644,720 A | 7/1997 | Boll et al. | |
| 5,644,768 A | 7/1997 | Periwal et al. | |
| 5,652,888 A | 7/1997 | Burgess | |
| 5,655,148 A | 8/1997 | Richman et al. | |
| 5,659,751 A | 8/1997 | Heninger | |
| 5,664,110 A | 9/1997 | Green et al. | |
| 5,664,111 A | 9/1997 | Nahan et al. | |
| 5,664,191 A | 9/1997 | Davidson et al. | |
| 5,666,493 A | 9/1997 | Wojcik et al. | |
| 5,671,225 A | 9/1997 | Hooper et al. | |
| 5,671,279 A | 9/1997 | Elgamal | |
| 5,675,796 A | 10/1997 | Hodges et al. | |
| 5,675,797 A | 10/1997 | Chung et al. | 395/674 |
| 5,680,573 A | 10/1997 | Rubin et al. | |
| 5,680,617 A | 10/1997 | Gough et al. | |
| 5,684,955 A | 11/1997 | Meyer et al. | |
| 5,689,709 A | 11/1997 | Corbett et al. | |
| 5,694,551 A | 12/1997 | Doyle et al. | |
| 5,706,435 A | 1/1998 | Barbara et al. | |
| 5,706,502 A | 1/1998 | Foley et al. | |
| 5,710,887 A | 1/1998 | Chelliah et al. | |
| 5,715,314 A | 2/1998 | Payne et al. | |
| 5,721,832 A | 2/1998 | Westrope et al. | |
| 5,724,540 A | 3/1998 | Kametani | |
| 5,724,588 A | 3/1998 | Hill et al. | |
| 5,727,048 A | 3/1998 | Hiroshima et al. | |
| 5,727,145 A | 3/1998 | Nessett et al. | |
| 5,729,594 A | 3/1998 | Klingman | |
| 5,737,607 A | 4/1998 | Hamilton et al. | |
| 5,742,768 A | 4/1998 | Gennaro et al. | |
| 5,745,678 A | 4/1998 | Herzberg et al. | |
| 5,745,695 A | 4/1998 | Gilchrist et al. | |
| 5,745,703 A | 4/1998 | Cejtin et al. | |
| 5,745,755 A | 4/1998 | Covey | |
| 5,748,897 A | 5/1998 | Katiyar | |
| 5,754,849 A | 5/1998 | Dyer et al. | |
| 5,754,977 A | 5/1998 | Gardner et al. | |
| 5,757,925 A | 5/1998 | Faybishenko | |
| 5,758,077 A | 5/1998 | Danahy et al. | |
| 5,758,328 A | 5/1998 | Giovannoli | |
| 5,758,344 A | 5/1998 | Prasad et al. | |
| 5,761,507 A | 6/1998 | Govett | |
| 5,761,656 A | 6/1998 | Ben-Shachar | |
| 5,764,897 A | 6/1998 | Khalidi | |
| 5,764,915 A | 6/1998 | Heimsoth et al. | |
| 5,768,532 A | 6/1998 | Megerian | |
| 5,774,551 A | 6/1998 | Wu et al. | |
| 5,774,729 A | 6/1998 | Carney et al. | |
| 5,778,179 A | 7/1998 | Kanai et al. | |
| 5,778,187 A | 7/1998 | Monteiro et al. | |
| 5,778,228 A * | 7/1998 | Wei | 709/315 |
| 5,778,368 A | 7/1998 | Hogan et al. | |
| 5,784,560 A | 7/1998 | Kingdon et al. | |
| 5,787,281 A * | 7/1998 | Schreiber et al. | 709/304 |
| 5,787,425 A | 7/1998 | Bigus | |
| 5,787,431 A | 7/1998 | Shaughnessy | |
| 5,790,548 A | 8/1998 | Sistanizadeh et al. | |
| 5,790,677 A | 8/1998 | Fox et al. | |
| 5,794,207 A | 8/1998 | Walker et al. | |
| 5,799,173 A | 8/1998 | Gossler et al. | |
| 5,802,367 A | 9/1998 | Held et al. | |
| 5,805,805 A | 9/1998 | Civanlar et al. | |
| 5,806,042 A | 9/1998 | Kelly et al. | |
| 5,808,911 A | 9/1998 | Tucker et al. | |
| 5,809,144 A | 9/1998 | Sirbu et al. | |
| 5,809,507 A | 9/1998 | Cavanaugh, III | |
| 5,812,819 A | 9/1998 | Rodwin et al. | |
| 5,813,013 A | 9/1998 | Shakib et al. | |
| 5,815,149 A | 9/1998 | Mutschler, III et al. | |
| 5,815,709 A | 9/1998 | Waldo et al. | |
| 5,815,711 A | 9/1998 | Sakamoto et al. | |
| 5,818,448 A | 10/1998 | Katiyar | |
| 5,829,022 A | 10/1998 | Watanabe et al. | |
| 5,832,219 A | 11/1998 | Pettus | |
| 5,832,529 A | 11/1998 | Wollrath et al. | |
| 5,832,593 A | 11/1998 | Wurst et al. | |
| 5,835,737 A | 11/1998 | Sand et al. | |
| 5,842,018 A | 11/1998 | Atkinson et al. | |
| 5,844,553 A | 12/1998 | Hao et al. | |
| 5,845,090 A | 12/1998 | Collins, III et al. | |

| Patent No. | Date | Inventor(s) |
|---|---|---|
| 5,845,129 A | 12/1998 | Wendorf et al. |
| 5,850,442 A | 12/1998 | Muftic |
| 5,860,004 A | 1/1999 | Fowlow et al. |
| 5,860,153 A | 1/1999 | Matena et al. |
| 5,864,862 A | 1/1999 | Kriens et al. |
| 5,864,866 A | 1/1999 | Henckel et al. |
| 5,872,928 A | 2/1999 | Lewis et al. |
| 5,872,973 A | 2/1999 | Mitchell et al. |
| 5,873,099 A | 2/1999 | Hogan et al. |
| 5,875,335 A | 2/1999 | Beard |
| 5,878,411 A | 3/1999 | Burroughs et al. |
| 5,884,024 A | 3/1999 | Lim et al. |
| 5,884,079 A | 3/1999 | Furusawa |
| 5,887,134 A | 3/1999 | Ebrahim |
| 5,887,172 A * | 3/1999 | Vasudevan et al. ......... 709/330 |
| 5,889,951 A | 3/1999 | Lombardi |
| 5,890,158 A | 3/1999 | House et al. |
| 5,892,904 A | 4/1999 | Atkinson et al. |
| 5,913,029 A | 6/1999 | Shostak |
| 5,933,497 A | 8/1999 | Beetcher et al. |
| 5,933,647 A | 8/1999 | Aronberg et al. |
| 5,935,249 A | 8/1999 | Stern et al. |
| 5,940,827 A | 8/1999 | Hapner et al. |
| 5,944,793 A | 8/1999 | Islam et al. |
| 5,946,485 A | 8/1999 | Weeren et al. |
| 5,946,694 A | 8/1999 | Copeland et al. |
| 5,949,998 A | 9/1999 | Fowlow et al. |
| 5,951,652 A | 9/1999 | Ingrassia, Jr. et al. |
| 5,956,509 A | 9/1999 | Kevner |
| 5,961,582 A | 10/1999 | Gaines |
| 5,963,924 A | 10/1999 | Williams et al. |
| 5,963,947 A | 10/1999 | Ford et al. |
| 5,966,531 A | 10/1999 | Skeen et al. |
| 5,969,967 A | 10/1999 | Aahlad et al. |
| 5,974,201 A | 10/1999 | Chang et al. |
| 5,978,484 A | 11/1999 | Apperson et al. |
| 5,982,773 A | 11/1999 | Nishimura et al. |
| 5,987,506 A | 11/1999 | Carter et al. |
| 5,991,808 A | 11/1999 | Broder et al. |
| 5,996,075 A | 11/1999 | Matena |
| 5,999,179 A | 12/1999 | Kekic et al. |
| 5,999,988 A * | 12/1999 | Pelegri-Llopart et al. ... 719/330 |
| 6,003,050 A | 12/1999 | Silver et al. |
| 6,003,763 A | 12/1999 | Gallagher et al. |
| 6,009,103 A | 12/1999 | Woundy |
| 6,009,413 A | 12/1999 | Webber et al. |
| 6,009,464 A | 12/1999 | Hamilton et al. |
| 6,016,496 A | 1/2000 | Roberson |
| 6,016,516 A | 1/2000 | Horikiri |
| 6,018,619 A | 1/2000 | Allard et al. |
| 6,023,586 A | 2/2000 | Gaisford et al. |
| 6,026,414 A | 2/2000 | Anglin |
| 6,031,977 A | 2/2000 | Pettus |
| 6,032,151 A | 2/2000 | Arnold et al. |
| 6,034,925 A | 3/2000 | Wehmeyer |
| 6,044,381 A | 3/2000 | Boothby et al. |
| 6,052,724 A | 4/2000 | Willie et al. |
| 6,052,761 A | 4/2000 | Hornung et al. |
| 6,055,562 A | 4/2000 | Devarakonda et al. |
| 6,058,381 A | 5/2000 | Nelson |
| 6,058,383 A | 5/2000 | Narasimhalu et al. |
| 6,061,699 A | 5/2000 | DiCecco et al. |
| 6,061,713 A | 5/2000 | Bharadhwaj |
| 6,067,575 A | 5/2000 | McManis et al. |
| 6,078,655 A | 6/2000 | Fahrer et al. |
| 6,085,255 A | 7/2000 | Vincent et al. |
| 6,092,194 A | 7/2000 | Touboul |
| 6,093,216 A | 7/2000 | Adl-Tabatabai et al. |
| 6,104,716 A | 8/2000 | Crichton et al. |
| 6,108,346 A | 8/2000 | Doucette et al. |
| 6,134,603 A | 10/2000 | Jones et al. |
| 6,154,844 A | 11/2000 | Touboul et al. |
| 6,157,960 A | 12/2000 | Kaminsky et al. |
| 6,157,961 A * | 12/2000 | Kessler et al. ............... 709/330 |
| 6,167,449 A | 12/2000 | Arnold et al. |
| 6,182,083 B1 | 1/2001 | Scheifler et al. |
| 6,185,602 B1 | 2/2001 | Bayrakeri |
| 6,185,611 B1 | 2/2001 | Waldo et al. |
| 6,189,046 B1 | 2/2001 | Moore et al. |
| 6,192,044 B1 | 2/2001 | Mack |
| 6,199,068 B1 | 3/2001 | Carpenter |
| 6,199,116 B1 | 3/2001 | May et al. |
| 6,212,578 B1 | 4/2001 | Racicot et al. |
| 6,216,138 B1 | 4/2001 | Wells et al. |
| 6,216,158 B1 | 4/2001 | Luo et al. |
| 6,219,675 B1 | 4/2001 | Pal et al. |
| 6,219,694 B1 | 4/2001 | Lazaridis et al. |
| 6,226,746 B1 | 5/2001 | Scheifler |
| 6,243,716 B1 | 6/2001 | Waldo et al. |
| 6,243,814 B1 | 6/2001 | Matena |
| 6,247,091 B1 | 6/2001 | Lovett |
| 6,253,256 B1 | 6/2001 | Wollrath et al. |
| 6,263,350 B1 | 7/2001 | Wollrath et al. |
| 6,263,379 B1 | 7/2001 | Atkinson et al. ........... 709/332 |
| 6,272,559 B1 | 8/2001 | Jones et al. |
| 6,282,295 B1 | 8/2001 | Young et al. |
| 6,282,568 B1 | 8/2001 | Sondur et al. |
| 6,282,581 B1 | 8/2001 | Moore et al. |
| 6,292,934 B1 | 9/2001 | Davidson et al. |
| 6,301,613 B1 | 10/2001 | Ahlstrom et al. |
| 6,339,783 B1 | 1/2002 | Horikiri |
| 6,343,308 B1 | 1/2002 | Marchesseault |
| 6,385,643 B1 | 5/2002 | Jacobs et al. |
| 6,408,342 B1 | 6/2002 | Moore et al. |
| 6,418,468 B1 | 7/2002 | Ahlstrom et al. |
| 6,578,074 B1 | 6/2003 | Bahlmann |
| 6,654,793 B1 * | 11/2003 | Wollrath et al. ............. 709/217 |
| 2002/0059212 A1 * | 5/2002 | Takagi .......................... 707/3 |
| 2003/0191984 A1 | 10/2003 | Murphy et al. |

FOREIGN PATENT DOCUMENTS

| | | |
|---|---|---|
| EP | 0 474 340 A2 | 3/1992 |
| EP | 497 022 A1 | 8/1992 |
| EP | 0 555 997 A2 | 8/1993 |
| EP | 0 565 849 A2 | 10/1993 |
| EP | 0 569 195 A3 | 11/1993 |
| EP | 0 625 750 A2 | 11/1994 |
| EP | 0 635 792 A2 | 1/1995 |
| EP | 0 651 328 A1 | 5/1995 |
| EP | 0 660 231 A2 | 6/1995 |
| EP | 0 697 655 A2 | 2/1996 |
| EP | 0 718 761 A1 | 6/1996 |
| EP | 0 767 432 A2 | 4/1997 |
| EP | 0 778 520 A2 | 6/1997 |
| EP | 0 794 493 A2 | 9/1997 |
| EP | 0 803 810 A2 | 10/1997 |
| EP | 0 803 811 A2 | 10/1997 |
| EP | 0 805 393 A2 | 11/1997 |
| EP | 0 810 524 A1 | 12/1997 |
| EP | 0 817 020 A2 | 1/1998 |
| EP | 0 817 022 A2 | 1/1998 |
| EP | 0 817 025 A2 | 1/1998 |
| EP | 0 836 140 A2 | 4/1998 |
| GB | 2 253 079 A | 8/1992 |
| GB | 2 262 825 A | 6/1993 |
| GB | 2 305 087 A | 3/1997 |
| JP | 11-45187 | 2/1999 |
| WO | WO92/07335 A1 | 4/1992 |
| WO | WO92/09948 A1 | 6/1992 |
| WO | WO94/03855 A1 | 2/1994 |
| WO | WO96/03692 A1 | 2/1996 |
| WO | WO96/10787 A1 | 4/1996 |

| | | |
|---|---|---|
| WO | WO96/18947 A1 | 6/1996 |
| WO | WO96/24099 A1 | 8/1996 |
| WO | WO98/02814 | 1/1998 |
| WO | WO98/04971 | 2/1998 |
| WO | WO 99/17194 | 4/1999 |
| WO | WO 01/13228 A2 | 2/2001 |
| WO | WO 01/86394 A2 | 11/2001 |
| WO | WO 01/90903 A1 | 11/2001 |

OTHER PUBLICATIONS

Mitchell et al; An Overview of the Spring System, Feb. 1994.*

Kougiouris et al; Support for Space Efficient Object Invocation in Spring, Sep. 1994.*

Hamilton et al; Subcontract; a flexible base for distributed programming; Proceedings of 14th Symposium of Operating System Principles, Dec. 1993.*

Birrell et al; Network Objects, Feb. 28, 1994.*

Rosenberry et al; Understanding DCE; Chapters 1–3,6; 1992.*

Jacquemont et al; "An Overview of COOL and COOL–IDL", pp 1–22, Mar. 1994.*

"Chaining of remote prodecure calls in distributed computer environment/remote procedure call", IBN TDB, vol. 36, No. 10, pp. 131–134, Oct. 1993.*

"Java (TM) Remote Method Invocation Specification," Sun Microsystems, Inc., <java.sun.com/products/jdk1.2beta1>, 1997.

Aldrich et al., "Providing Easier Access to Remote Objects in Client–Server Systems," System Sciences, 1998, Proceedings of the 31st Hawaii Internat'l. Conference, Jan. 6–9, 1998, pp. 366–375.

Aldrich et al., "Providing Easier Access to Remote Objects in Distributed Systems," Calif. Institute of Technology, www.cs.caltech.edu%7Ejedi/paper/jedipaper.html, Nov. 21, 1997.

Alexander et al., "Active Bridging," Proceedings of the ACM/SIGCOMM'97 Conference, Cannes, France, Sep. 1997.

Burns et al., "An Analytical Study of Opportunistic Lease Renewal," Distributed Computing Systems, 21st International Conference, pp. 146–153, Apr. 2000.

Fleish et al., "High Performance Distributed Objects Using Distributed Shared Memory & Remote Method Invocation," System Sciences, 1998, Proceedings of the 31st Hawaii Internat'l. Conference, Jan. 6–9, 1998, pp. 574–578.

Guth, "JavaOne: Sun to Expand Java Distributed Computing Effort," <http://www.sunworld.com/swol–02–1998/swol–02–sunspots.html>, XP–002109935, P.1, Feb. 20, 1998.

Guyennet et al., "A New Consistency Protocol Implemented in the CAliF System," IEEE, 1094–7256/97, pp. 82–87, 1997.

Guyennet et al., "Distributed Shared Memory Layer for Cooperative Work Applications," IEEE, 0742–1303/97, pp. 72–78, 1997.

Hamilton, "Java and the Shift to Net–Centric Computing," Computer, pp. 31–39, Aug. 1996.

Harris et al., "Proposal for a General Java Proxy Class for Distributed Systems and Other Uses," Netscape Communications Corp., Jun. 25, 1997.

Hartman et al., "Liquid Software: A New Paradigm For Networked Systems," Technical Report 96–11, Department of Comp. Sci., Univ. of Arizona, Jun. 1996.

Hoshi et al., "Allocation of the Cross–Connect Function in Leased Circuit Networks," 1992, ICC'92, conference record, SUPERCOMM/ICC '92, A New World of Communications, IEEE International Conference, pp. 1408–1412.

Jaworski, "Java 1.1 Developer's Guide, 2nd Edition," Sams.net, 1997.

McGrath, "Discovery and its Discontents: Discovery Protocols for Ubiquitous Computing," Presented at Center for Excellence in Space Data and Information Science, NASA Goddard Space Flight Center, Apr. 5, 2000.

Mitchell et al., "Mesa Language Manual," Xerox Corporation, Palo Alto Research Center, 1978.

Riggs et al., "Pickling State in the Java (TM) System," USENIX Association Conference on Object–Oriented Technologies and Systems, XP–002112719, pp. 241–250, Jun. 17–21, 1996.

Venners, "Jini Technology, Out of the Box," JAVAWORLD, 'Online!, pp. 1–4, Dec. 1998.

Wollrath et al., "A Distributed Object Model for the Java (TM) System," USENIX Association, Conference on Object–Oriented Technologies and Systems, Jun. 17–21, 1996.

Yemini et al., "Towards Programmable Networks," IFIP/IEEE International Workshop on Distributed Systems: Operations and Management, L'Aquila, Italy, Oct. 1996.

Yin et al., "Using Leases to Support Server Driven Consistency in Large–Scale Systems," Computer Services Department, University of Texas at Austin, p. 285–294, May 26–28, 1998.

Yin et al., "Volume Leases for Consistency in Large–Scale Systems," IEEE Transactions on Knowledge & Data Engineering, vol. 11, No. 4, pp. 563–576, Jul./Aug. 1999.

"Eden Project Proposal," Department of Computer Science, University of Washington, Oct. 1980, Technical Report #80–10–01, cover and Foreword.

Almes et al., "Edmas: A Locally Distributed Mail System," Department of Computer Science, University of Washington, Technical Report 83–07–01, Jul. 7, 1983, Abstract & pp. 1–17.

Almes et al., "Research in Integrated Distributed Computing," Department of Computer Science, University of Washington, Oct. 1979, pp. 1–42.

Almes et al., "The Eden System: A Technical Review," Department of Computer Science, University of Washington, Technical Report 83–10–05, Oct. 1983, pp. 1–25.

Almes, "Integration and Distribution in the Eden System," Department of Computer Science, University of Washington, Technical Report 83–01–02, Jan. 19, 1983, pp. 1–18 & Abstract.

Almes, "The Evolution of the Eden Invocation Mechanism," Department of Computer Science, University of Washington, Technical Report 83–01–03, Jan. 19, 1983, pp. 1–14 & Abstract.

Arnold, Ken, "The Jini Architecture: Dynamic Services in a Flexible Network," Sun Microsystems, Inc., Proceedings of the 36th ACM IEEE Design Automation Conference, Jun. 1999, pp. 157–162.

Begole et al., "Transparent Sharing of Java Applets: A Replicated Approach," Oct. 1997, pp. 55–65.

Black et al., "A Language for Distributed Programming," Department of Computer Science, University of Washington, Technical Report 86–02–03, Feb. 1986, p. 10.

Black et al., "Distribution and Abstract Types in Emerald," University of Washington, Technical Report No. 85–08–05, Aug. 1985, pp. 1–10.

Black et al., "Object Structure in the Emerald System," University of Washington, Technical Report 86–04–03, Apr. 1986, pp. 1–14.

Black et al., "The Eden Project: A Final Report," Department of Computer Science, University of Washington, Technical Report 86–11–01, Nov. 1986, pp. 1–28.

Black, "Supporting Distributed Appliations: Experience with Eden," Department of Computer Science, University of Washington, Technical Report 85–03–02, Mar. 1985, pp. 1–21.

Black, "The Eden Programming Language," Department of Computer Science, FR–35, University of Washington, Technical Report 85–09–01, Sep. 1985 (Revised Dec. 1985), pp. 1–19.

Black, "The Eden Project: Overview and Experiences," Department of Computer Science, University of Washington, EUUG, Autumn '86 Conference Proceedings, Manchester, UK, Sep. 22–25, 1986, pp. 177–189.

Braine et al., "Object–Flow," pp. 418–419.

Ciancarini et al., "Coordinating Distributed Applets with Shade/Java," Feb. 1998, pp. 130–138.

Delcambre et al., "Simulation of the Object Flow Model: A Conceptual Modeling Language for Object–Driven Applications," 1993, pp. 216–225.

Goldberg et al., "Smalltalk–80—The Language and its Implementation," Xerox Palo Alto Research Center, 1983 (reprinted with corrections, Jul. 1985), pp. 1–720.

Holman et al., "The Eden Shared Calendar System," Department of Computer Science, FR–35, University of Washington, Technical Report 85–05–02, Jun. 22, 1985, pp. 1–14.

Hsu, "Reimplementing Remote Prodecure Calls" University of Washington, Thesis, Mar. 22, 1985, pp. 1–106.

Hutchinson, "Emerald: An Object–Based Language for Distributed Programming," a Dissertation, University of Washington, 1987, pp. 1–107.

Jacob, "The Use of Distributed Objects and Dynamic Interfaces in a Wide–Area Transaction Environment," SIGCOMMn'95 Workshop on Middleware: Cambridge, Mass., Aug. 1995, pp. 1–3.

Jul et al., "Fine–Grained Mobility in the Emerald System," University of Washington, ACM Transactions on Computer Systems, vol. 6, No. 1, Feb. 1988, pp. 109–133.

Jul, "Object Mobility in a Distributed Object–Oriented System," a Dissertation, University of Washington, 1989, pp. 1–154 (1 page Vita).

Koshizuka et al., "Window Real–Objects: A Distributed Shared Memory for Distributed Implementation of GUI Applications," Nov. 1993, pp. 237–247.

Krasner et al., "Smalltalk–80: Bits of History, Words of Advice," 1983, Xerox Corporation, pp. 1–344.

Lavana et al., "Executable Workflows: A Paradigm for Collaborative Design on the Internet," Jun. 1997, 6 pages.

Proceedings of the Eighth Symposium on Operating Principles, Dec. 14–16, 1981, ACM, Special Interest Group on Operating Systems, Association for Computing Machinery, vol. 15, No. 5, Dec. 1981, ACM Order No. 534810.

Proudfoot, "Replects: Data Replication in the Eden System," Department of Computer Science, University of Washington, Technical Report No. TR–85–12–04, Dec. 1985, pp. 1–156.

Pu, "Replication and Nested Transaction in the Eden Distributed System," Doctoral Dissertation, University of Washington, Aug. 6, 1986, pp. 1–179 (1 page Vita).

Trehan et al., "Toolkit for Shared Hypermedia on a Distributed Object Oriented Architecture," 1993, pp. 1–8.

"Transparent Network Computing," Locus Computing Corporation, Jan. 5, 1995.

Agha et al., "Actorspaces: An Open Distributed Programming Paradigm," University of Illinois, Report No. UIUCDCS–R–92–1766, Open Systems Laboratory TR No. 8, pp. 1–12, Nov. 1992.

Ahmed et al., "A Program Building Tool for Parallel Applications," Yale University, pp. 1–23, Dec. 1, 1993.

Anderson et al., "Persistent Linda: Linda + Transactions + Query Processing," Proceedings of the 13th Symposium on Fault Tolerant Systems, pp. 93–109, 1991.

Anonymous, "Change–Notification Service for Shared Files," IBM Technical Disclosure Bulletin, vol. 36, No. 8, pp. 77–82, XP002108713, New York, US, Aug. 1993.

Anonymous, "Resource Preemption for Priority Scheduling," IBM Technical Disclosure Bulletin, vol. 16, No. 6, p. 1931, XP002109435 New York, US, Nov. 1973.

Beech et al., "Object Databases as Generalizations of Relational Databases," Computer Standards & Interfaces, vol. 13, Nos. 1/3, pp. 221–230, Amsterdam, NL, Jan. 1991.

Bertino et al., "Object–Oriented Database Management Systems: Concepts and Issues," Computer, vol. 24, No. 4, pp. 33–47, Los Alamitos, CA, Apr. 1991.

Bevan et al., "An Efficient Reference Counting Solution To The Distributed Garbage Collection Problem," Parallel Computing, NL, Elsevier Science Publishers, Amsterdam, vol. 9, No. 2, pp. 179–192, Jan. 1989.

Birrell et al., "Distributed Garbage Collection for Network Objects," Digital Systems Research Center, No. 116, pp. 1–18, Dec. 15, 1993.

Birrell et al., "Grapevine: An Exercise in Distributed Computing," Communications of the ACM, vol. 25, No. 4, pp. 260–274, Apr. 1982.

Birrell et al., "Implementing Remote Procedure Calls," ACM Transactions on Computer Systems, vol. 2, No. 1, pp. 39–59, Feb. 1984.

Birrell et al., "Network Objects," Operating Systems Review, 27(5), pp. 217–230, Dec. 1993.

Cannon et al., "Adding Fault–Tolerant Transaction Processing to LINDA," Software–Practice and Experience, vol. 24(5), pp. 449–466, May 1994.

Cardelli, "Obliq, A Lightweight Language For Network Objects," Digital SRC, pp. 1–37, Nov. 5, 1993.

Carriero et al., "Distributed Data Structures in Linda," Principles of Programming Language, pp. 1–16, 1986.

Carriero et al., "Distributed Data Structures in Linda," Yale Research Report YALEU/DCS/RR–438, Nov. 1985.

Chung et al., "A 'Tiny' Pascal Compiler: Part 1: The P–Code Interpreter," BYTE Publicatios, Inc., Sep. 1978.

Chung et al., "A 'Tiny' Pascal Compiler: Part 2: The P–Compiler," BYTE Publications, Inc., Oct. 1978.

Coulouris et al., "Distributed Systems Concepts and Designs," Second Edition, Addison–Wesley, 1994.

Dave et al., "Proxies, Application Interface, And Distributed Systems," Proceedings International Workshop On Object Orientation in Operating Systems, pp. 212–220, Sep. 24, 1992.

Deux et al., "The O2 System," Communications Of The Association For Computing Machinery, vol. 34, No. 10, pp. 34–48, Oct. 1, 1991.

Dijkstra, "Self-stabilizing Systems in Spite of Distributed Control," Communications of the ACM, vol. 17, No. 11, pp. 643–644, Nov. 1974.

Dolev et al., "On the Minimal Synchronism Needed for Distributed Consensus," Journal of the ACM, vol. 34, No. 1, pp. 77–97, Jan. 1987.

Dourish, "A Divergence–Based Model for Synchrony and Distribution in Collaborative Systems," Xerox Technical Report EPC–1194–102, pp. 1–10, 1994.

Drexler et al., "Incentive Engineering for Computational Resource Management," The Ecology of Computation, Elsevier Science Publishers B.V., pp. 231–266, 1988.

Droms, "RFC 1541 Dynamic Host Configuration Protocol," <http://www.cis.ohio–state.edu/htbin/rfc/rfc1541.html>, pp. 1–33, Oct. 1993.

Emms, "A Definition Of An Access Control Systems Language," Computer Standards And Interfaces, vol. 6, No. 4, pp. 443–454, Jan. 1, 1987.

Gelernter et al., "Parallel Programming in Linda," Yale University, pp. 1–21, Jan. 1985.

Gelernter, "Generative Communication in Linda," ACM Transactions on Programming Languages and Systems, vol. 7, No. 1, pp. 80–112, Jan. 1985.

Gosling et al., "The Java (TM) Language Specification," Addison–Wesley, 1996.

Gray et al., "Leases: An Efficient Fault–Tolerant Mechanism for Distributed File Cache Consistency," ACM, pp. 202–210, 1989.

Howard et al., "Scale and Performance in a Distributed File System," ACM Transactions on Computer Systems, vol. 6, No. 1, pp. 51–81, Feb. 1988.

Hunt, "IDF: A Graphical Data Flow Programming Language for Image Processing and Computer Vision," Proceedings of the International Conference on Systems, Man, and Cybernetics, pp. 351–360, Los Angeles, Nov. 4–7, 1990.

IBM (TM) Technical Disclosure Bulletin, "Object Location Algorithm," vol. 36, No. 09B, pp. 257–258, Sep. 1993.

IBM (TM) Technical Disclosure Bulletin, "Retrieval of Qualified Variables Using Extendible Hashing," vol. 36, No. 12, pp. 301–303, Dec. 1993.

IBM, "Chapter 6—Distributed SOM (DSOM)," SOMobjects Developer Toolkit Users Guide, Version 2.1, pp. 6–1–6–90, Oct. 1994.

Jones et al., "Garbage Collection: Algorithms for Automatic Dynamic Memory Management," pp. 165–175, John Wiley & Sons, 1996.

Kambhatla et al., "Recovery with Limited Replay: Fault–Tolerant Processes in Linda," Oregon Graduate Insitute, Technical Report CSIE 90–019, pp. 1–16, Sep. 1990.

Kay et al., "An Overview of the Raleigh Object–Oriented Database System," ICL Technical Journal, vol. 7, No. 4, pp. 780–798, Oxford, GB, Nov. 1991.

Krasner, "The Smalltalk–80 Virtual Machine," BYTE Publications Inc., pp. 300–320, Aug. 1991.

Lamport et al., "The Byzantine Generals Problem," ACM Transactions on Programming Languages and Systems, vol. 4, No. 3, pp. 382–401, Jul. 1982.

LINDA Database Search, pp. 1–68, Jul. 20, 1995.

Lindholm et al., "The Java (TM) Virtual Machine Specification," Addison Wesley, 1996.

Liskov et al., "Distributed Object Management in Thor," International Workshop on Distributed Object Management, p. 12, 1992.

McDaniel, "An Analysis of a Mesa Instruction Set," Xerox Corporation, May 1982.

Mullender, "Distributed Systems," Second Edition, Addison–Wesley, 1993.

Mummert et al., "Long Term Distributed File Reference Tracing: Implementation and Experience," Carnegie Mellon University School of Computer Science, pp. 1–28, Nov. 1994.

Orfali et al., "The Essential Distributed Objects Survival Guide," Chapter 11: Corba Commercial ORBs, pp. 203–215, John Wiley & Sons, Inc., 1996.

Ousterhout et al., "The Sprite Network Operating System," Computer, IEEE, pp. 23–36, Feb. 1988.

Pier, "A Retrospective on the Dorando, A High–Performance Personal Computer," IEEE Conference Proceedings, The 10th Annual International Symposium on Computer Architecture, 1983.

Pier, "A Retrospective on the Dorando, A High–Performance Personal Computer," Xerox Corporation, Aug. 1983.

Pinakis, "Using Linda as the Basis of an Operating System Microkernel," University of Western Australia, Department of Computer Science, pp. 1–165, Aug. 1993.

Sharrott et al., "ObjectMap: Integrating High Performance Resources into a Distributed Object–oriented Environment," ICODP, 1995.

Thompson, "Regular Expression Search Algorithm," Communications of the ACM, vol. II, No. 6, p. 149 et seq., Jun. 1968.

Waldo et al., "Events In An RPC Based Distributed System," Proceedings Of The 1995 USENIX Technical Conference, Proceedings USENIX Winter 1995 Technical Conference, New Orleans, LA, USA, 16–20, pp. 131–142, Jan. 1995.

Wilson et al., "Design of the Opportunistic Garbage Collector," Proceedings of the Object Oriented Programming Systems Languages And Applications Conference, New Orleans, vol. 24, No. 10, Oct. 1989.

Wu, "A Type System For An Object–Oriented Database System," Proceedings of the International Computer Software and Applications Conference (COMPSAC), Tokyo, Japan, pp. 333–338, Sep. 11–13, 1991.

Kolodner et al., "Atomic Garbage Collection: Managing a Stable Heap," ACM, 1989, pp. 15–25.

"Consumers Can View, Share Picture On–Line as Kodak Picture Network Goes 'Live'," Business Wire, Aug. 25, 1997, pp. 18–19.

"ISN Dataweb Sells Software, Hardware," Datamation, Apr. 1, 1996, p. 40.

"Kodak DC220 And DC260 Digital Cameras Are Shipping To Retailers Across The Country Cameras Are Optimized for USB Interface Supported in Windows 98," Business Wire, Jun. 24, 1998, pp. 42–44.

"Kodak demonstrates leadership across entire photographic category," M2 Presswire, Feb. 13, 1998, pp. 31–35.

"Kodak PhotoNet Online Makes it a Snap to Share Summer Photos," PR Newswire, Jul. 2, 1998, pp. 63–64.

"Kodak Picture Network Sends Prints Home From the Holidays," Business Wire, Dec. 29, 1997, pp. 58–60.

"Photo processing made easy on the Internet; Storm Software and PictureVision team up with Konica Corp.," Business Wire, Feb. 22, 1996, pp. 3–4.

"Seeing your photos a whole new way," Business Wire, Dec. 12, 1996, pp. 9–10.

"Webwatch: MCI Announces Internet Access,", Boardwatch Magazine, Jan. 1995.

Administrator's Guide, Netscape Enterprise Server, Version 3.0, Netscape Communications Corp., 1998.

Bandrowski, "Stores Without Doors: Kiosks Generate New Profits," Corporate Computing, Oct. 1992, pp. 193–195.

Bruno, "Working the Web," Data Communications, Apr. 1997, pp. 50–60.

Cohen, "Electronic Commerce," USC/Information Sciences Institute, Oct. 1989.

Conhaim, "Online shopping: a beginner's guide; includes related listing of videotex services," Link–Up, vol. 5, No. 6, p. 32, Nov. 1988.

Design Project #2, Electronic Shopping at MIT, MIT Class 6.033 Handout 23, Massachusetts Institute of Technology, http://web.mit.edu/6.033/1995/handouts/html/h23.html, Spring 1995, pp. 1–6.

Ellsworth, "Boom Town," Internet World, Jun. 1995, pp. 33–35.

Estrin, "Inter–Organization Networks: Implications of Access Control Requirements for Interconnection Protocols," ACM, 1986, pp. 254–263.

Fleischer, "SkyMall's 'Supplier Network' Takes Flight", The Technology Magazine for Retail Executives, Apr. 1997.

Foley, "Managing Campus–Wide Information Systems: Issues and Problems," Capitalizing on Communication, ACM SIGUCCS XVII, 1989, pp. 169–174.

Fryxell, "eaasySABRE," Link–Up, May/Jun. 1996, pp. 10–11.

Gardner, "Kodak Follows Startup Into Online Photo Processing Business," Internet World, Sep. 8, 1997, pp. 5–6.

Gogan et al., "Open Market, Inc.: Managing in a Turbulent Environment," Harvard Business School Publishing, Aug. 29, 1996, pp. 1–30.

Israel et al., "Authentication in Office System Internetworks," ACM Transactions on Office Information Systems, vol. 1, No. 3, Jul. 1983, pp. 193–210.

Keller, "Smart Catalogs and Virtual Catalogs," Proceedings of the First USENIX Workshop of Electronic Commerce, USENIX Association, Jul. 11–12, 1995, pp. 125–131.

Klein et al., "TRADE'ex: The Stock Exchange of the Computer Industry," Harvard Business School Publishing, 1996, pp. 1–14.

Kodak Photonet FAQ, PhotoNet Online, Jun. 14, 2002, pp. 1–3.

Kramer, "NETWATCH; The AJC's Daily Online Guide; Get the Picture: Kodak will send photos to Web," The Atlanta Journal and Constitution, Sec. Features, p. 08C, Jun. 5, 1997.

Lampson et al., "Authentication in Distributed Systems: Theory and Practice," ACM Transactions n Computer Systems, vol. 10, No. 4, Nov. 1992, pp. 265–310.

Lansky, "Without APS, Photo Life Goes on Via Internet," Photographic Trade News, Aug. 1996, pp. 19–23.

Lewis, "Pacific Bell, MCI to Expand Internet Service," The New York Times, sec. D, col. 1 at 3, Mar. 28, 1995.

LightSurf Instant Imaging—Press Releases, "Kodak And LightSurf Collaborate On Kodak Picture Center Online," LifeSurf Technologies Inc., Jun. 14, 2002, pp. 1–3.

Louwerse et al., "Data Protection Aspects in an Integrated Hospital Information System," North–Holland Computers & Security 3, 1984, pp. 286–294.

McEnaney, "Point–and–Click Memory Sharing; Launches PhotoNet online digital photography and imaging services," Photographic Trade News, Sec. pg. 23, Jan. 1997.

Miller, "Web posting as a photo processing option," USA Today, Section: Life, p. 17D, Dec. 13, 1996.

Morris et al., "Andrew: A Distributed Personal Computing Environment," Communications of the ACM, vol. 29, No. 3, Mar. 1986, pp. 184–201.

O'Mahony, "Security Considerations in a Network Management Environment," IEEE Network, May/Jun. 1994, pp. 12–17.

Oppen et al., "The Clearinghouse: A Decentralized Agent for Locating Names Objects in a Distributed Environment," ACM Transactions on Office Information Systems, vol. 1, No. 3, Jul. 1983, pp. 230–253.

Petersen, "New But Not Improved, " Direct Magazine, Nov. 1995.

Press Release, "Sun Goes Live With The Kodak Picture Network," Sun Microsystems, Inc., Jun. 14, 2002, pp. 1–2.

Raeder, "Is there a Prodigy in your future?," Database Searcher, vol. 5, No. 6, p. 18.

Ramm et al., "Exu—A System for Secure Delegation of Authority on an Insecure Network," Ninth System Administration Conference, 1995 LISA IX, Sep. 17–22, 1995, pp. 89–93.

Satyanarayanan, "Integrating Security in a Large Distributed System," ACM Transactions on Computer Systems, vol. 7, No. 3, Aug. 1989, pp. 247–280.

Schroeder et al., "Experience with Grapevine: The Growth of a Distributed System," ACM Transactions on Computer Systems, vol. 2, No. 1, Feb. 1984, pp. 3–23.

Senn, "Capitalizing on Electronic Commerce: The Role of the Internet in Electronic Markets," Information Systems Management, Summer 1996, pp. 15–24.

Steinke, "Design Aspects of Access Control in a Knowledge Base System," Computers & Security, 10, 1991, pp. 612–625.

Stern, "Industry Net," Link–Up, Mar./Apr. 1995, p. 10.

Tanenbaum et al., "Distributed Operating Systems," Computing Surveys, vol. 17, No. 4, Dec. 1985, pp. 419–470.

The Wall Street Journal, "Barclays Is Opening An 'Electronic Mall' For Internet Shopping," Tech. & Health Section at B2, Jun. 1, 1995.

The Wall Street Journal, "Prodigy Plans to Announce Internet 'Electronic Mail'," Tech. Section at B5, Nov. 27, 1995.

Trommer, "Thomas Unveils Online Purchasing Network—Eases Product Sourcing And Ordering Through EDI," Electronic Buyers' News at 60, Dec. 11, 1995.

Van Den Berg et al., "Advanced Topics of a Computer Center Audit," North–Holland Computers & Security 3, 1984, pp. 171–185.

Van Der Lans, "Data Security in a Relational Database Environment," North–Holland Computers & Security 5, 1986, pp. 128–134.

Welz, "New Deals: A ripening internet market, secure systems and digital currency are reshaping global commerce," Internet World, Jun. 1995, pp. 36–41.

Wobber et al., "Authentication in the Taos Operating System," ACM, 1993, pp. 256–269.

Wyatt, "Netscape Enterprise Server," Prima Publishing, 1996.

Osborn, "The Role of Polymorphism in Schema Evolution in an Object–Oriented Database," IEEE Transactions on Knowledge and Data Engineering, vol. 1, No. 3, Sep. 1989, pp. 310–317.

Forman, George H., et al., "The Challenges of Mobile Computing", Mar. 9, 1994, University of Washington Computer Science & Engineering, pp. 8–9.

Gottlob et al., "Extending Object–Oriented Systems with Roles," ACM Transactions On Information Systems, vol. 14, No. 3, pp. 268–296, Jul. 1996.

Amitabh et al., "Proxies, Application Interfaces, and Distributed Systems," IEEE, pp. 212–220, 1992.

Wollrath et al., "Java–Centric Distributed Computing," IEEE Micro, pp. 44–53, 1997.

Auto–Id Center, "Auto–ID Savant Specification 1.0," Version of Oct. 13, 2003 (58 pages).

H.A. Smith and J.D. McKeen, "Object–Oriented Technology: Getting Beyond the Hype," ACM, Spring 1996, vol. 27, pp. 20–29.

Java Remote Method Invocation Specification, JDK 1.1 FCS, Sun Microsystems, Inc. Feb. 1997, chapters 5 and 7.

Jennings, N.R. et al., "Using Intelligent Agents to Manage Business Processes," Dept. Electronic Engineering, Queen Mary & Westfield College, Mile End Road, London, E1 4NS, U.K., XP–002254546, 1996, 16 pages.

Douglas Hodges, "Managing Object Lifetimes in OLE"; Aug. 25, 1994, pp. 1–41.

Dave et al., "Proxies, Application Interfaces, and Distributed Systems," XP 002009478, IEEE, pp. 212–220, 1992.

Dollimore et al., "The Design of a System for Distributing Shared Objects," The Computer Journal, No. 6, Cambridge, GB, Dec., 1991.

MUX–Elektronik, Java 1.1 Interactive Course, www.lls.se/~mux/javaic.html, 1995.

Stevenson, "Token–Based Consistency of Replicated Servers," IEEE, CH2686–4/89/0000/0179, pp. 179–183, 1989.

"Java (TM) Object Serialization Specification," Sun Microsystems, Inc., XP–002242372, <www.dei.estg.iplei.pt/P3/N/material/serial–spec–JDK1 2.pdf>, Nov. 30, 1998 (76 pages).

Chan, P. et al., *The Java Class Libraries, 2$^{nd}$ Edition*, vol. 1, "Java.io ObjectinputStream," XP–002243027, pp. 1230–1232, 1262–1264, and 1283, Mar. 9, 1998 (7 pages).

Opyrchal et al., "Efficient Object Serialization in Java," Department of Electrical Engineering and Computer Science, University of Michigan, XP–002242373, May 31, 1999 (6 pages).

* cited by examiner

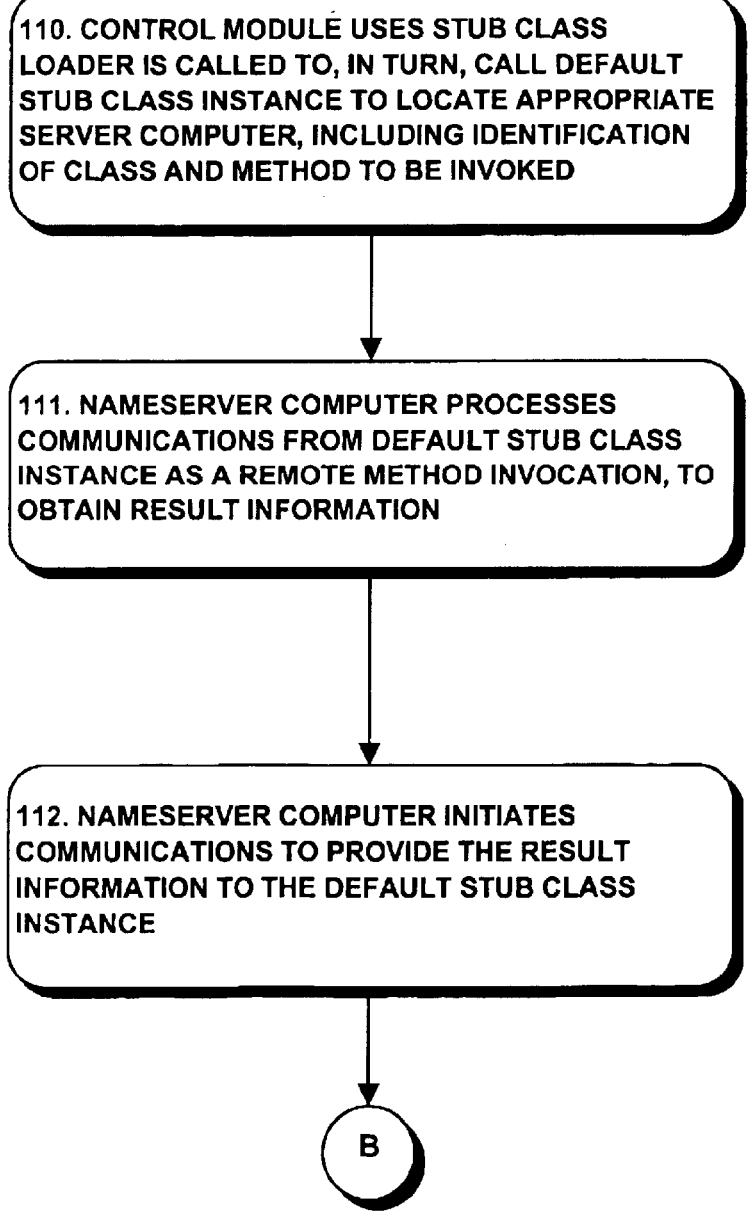

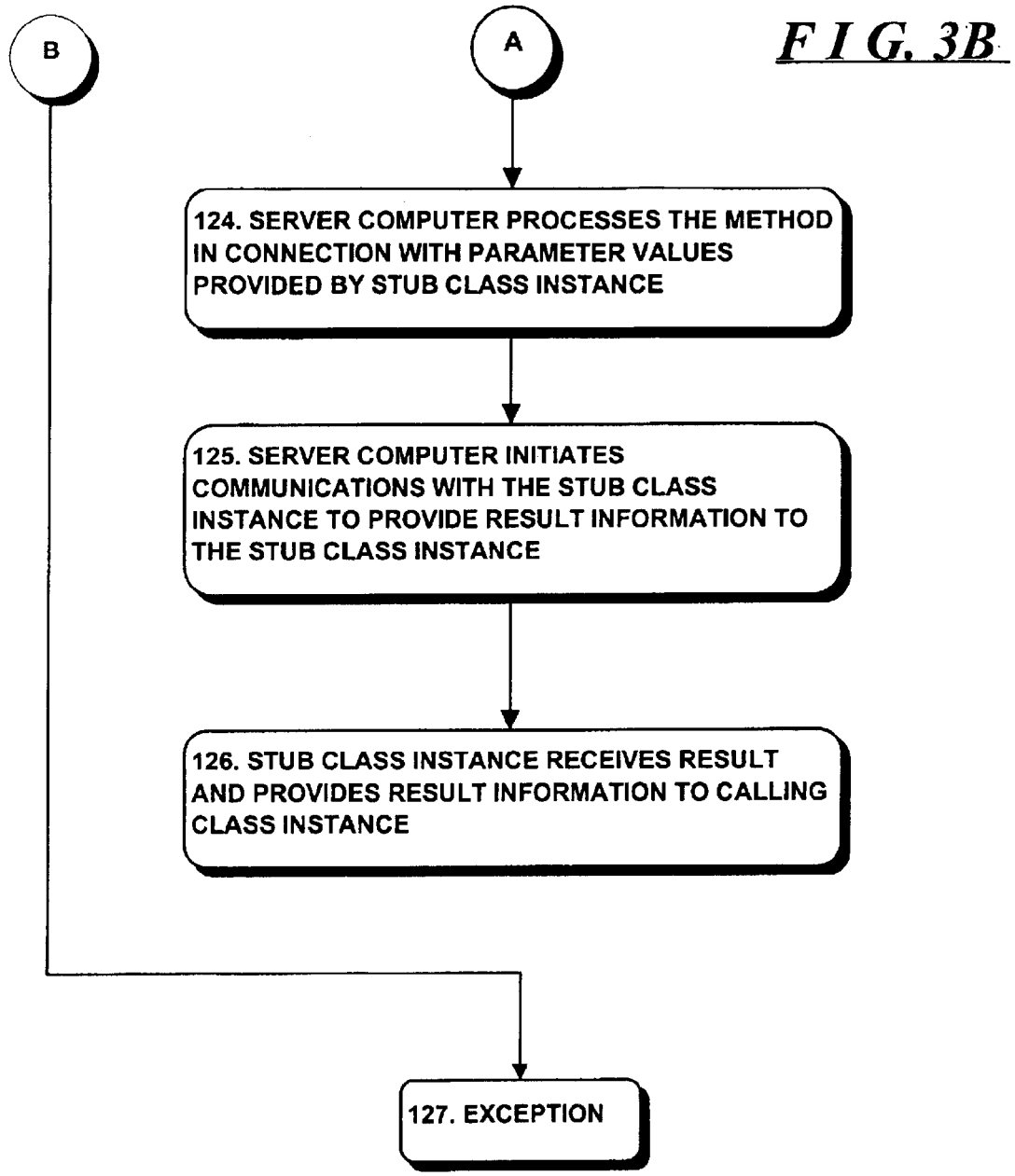

SYSTEM AND METHOD FOR FACILITATING DYNAMIC LOADING OF "STUB" INFORMATION TO ENABLE A PROGRAM OPERATING IN ONE ADDRESS SPACE TO INVOKE PROCESSING OF A REMOTE METHOD OR PROCEDURE IN ANOTHER ADDRESS SPACE

INCORPORATION BY REFERENCE

The Java™ Language Specification (Sun Microsystems, Inc., 1993–95), (hereinafter referred to as the "Java language specification") a copy of which is attached hereto as Appendix A, incorporated herein by reference.

The Java Virtual Machine Specification (Sun Microsystems, Inc., 1993–95), (hereinafter referred to as the "Java virtual machine specification") a copy of which is attached hereto as Appendix B, incorporated herein by reference.

Ann Wollrath, et al., "A Distributed Object Model for Java™," an unpublished paper attached hereto as Appendix C, incorporated herein by reference.

U.S. Patent Application Ser. No. 08/636,707 (now U.S. Pat. No. 5,815,709), filed on even date in the names of James H. Waldo, Krishna Bharat and Roger Riggs, and entitled "System and Method For Generating Identifiers For Uniquely Identifying Object Types For Objects Used in Processing Of Object-Oriented Programs And The Like" (hereinafter identified as the "Waldo et al. patent application"), incorporated herein by reference.

FIELD OF THE INVENTION

The invention relates generally to the field of digital computer systems, and more particularly to systems and methods for facilitating the invocation by a program being processed by a computer in one address space, of processing of methods and procedures in another address space, which may be implemented either on the same computer or on another computer. The invention particularly provides a system and method for obtaining and dynamically loading "stub" information which facilitates invocation by a program operating in one address space of a remote method or procedure in another address space, and possibly on another computer.

BACKGROUND OF THE INVENTION

In modern "enterprise" computing, a number of personal computers, workstations, and other devices such as mass storage subsystems, network printers and interfaces to the public telephony system, are typically interconnected in one or more computer networks. The personal computers and workstations are used by individual users to perform processing in connection with data and programs that may be stored in the network mass storage subsystems. In such an arrangement, the personal computers/workstations, operating as clients, typically download the data and programs from the network mass storage subsystems for processing. In addition, the personal computers or workstations will enable processed data to be uploaded to the network mass storage subsystems for storage, to a network printer for printing, to the telephony interface for transmission over the public telephony system, or the like. In such an arrangement, the network mass storage subsystems, network printers and telephony interface operate as servers, since they are available to service requests from all of the clients in the network. By organizing the network in such a manner, the servers are readily available for use by all of the personal computers/workstations in the network. Such a network may be spread over a fairly wide area, with the personal computers/workstations being interconnected by communication links such as electrical wires or optic fibers.

In addition to downloading information from servers for processing, a client, while processing a program, can remotely initiate processing by a server computer of particular routines and procedures (generally "procedures"), in connection with certain "parameter" information provided by the client. After the server has processed the procedure, it will provide results of its processing to the client, which the client may thereafter use in its processing operations. Typically in such "remote procedure calls" the program will make use of a local "stub" which, when called, transfers the request to the server which implements the particular procedure, receives the results and provides them to the program. Conventionally, the stub must be compiled with the program, in which case the information needed to call the remote procedure must be determined at compile time, rather than at the time the program is run. Since the stub available to the client's programs is static, it may be at best the closest that can be determined should be provided for the program when it (the program) is compiled. Accordingly, errors and inefficiencies can develop due to mismatches between the stub that is provided to a program and the requirements of the remote procedure that is called when the program is run.

SUMMARY OF THE INVENTION

The invention provides a new and improved system and method for facilitating the obtaining and dynamic loading of a stub provided to enable a program operating in one address space to remotely invoke processing of a method or procedure in another address space, so that the stub can be loaded by the program when it is run and needed, rather than being statically determined when the program is compiled. Indeed, the stub that is loaded can be obtained from the resource providing the remote method or procedure, and so it (the stub) can exactly define the invocation requirements of the remote method or procedure. Since the stub can be located and dynamically loaded while the program is being run, rather that being statically determined when the program is compiled, run-time errors and inefficiencies which may result from mismatches between the stub that is provided and the requirements of the remote method or procedure that is invoked can be minimized.

In brief summary, the invention provides a stub retrieval and loading subsystem for use in connection with a remote method invocation system. The stub retrieval and loading subsystem controls the retrieval and loading of a stub for a remote method, into an execution environment, to facilitate invocation of the remote method by a program executing in the execution environment. The stub retrieval subsystem includes a stub retriever for initiating a retrieval of the stub and stub loader for, when the stub is received by the stub retriever, loading the stub into the execution environment, thereby to make the stub available for use in remote invocation of the remote method. In one embodiment, the stub retrieval and loading subsystem effects the retrieval and loading for a program operating in one address space provided by one computer, of stub class instances to effect the remote invocation of methods which are provided by objects operating in another address space, which may be provided by the same computer or a different computer. In that same embodiment, the stub retrieval and loading subsystem effects the retrieval and loading of a stub class instance when the remote object is referenced, although in other embodiments retrieval and loading may be effected when the remote method is invoked.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
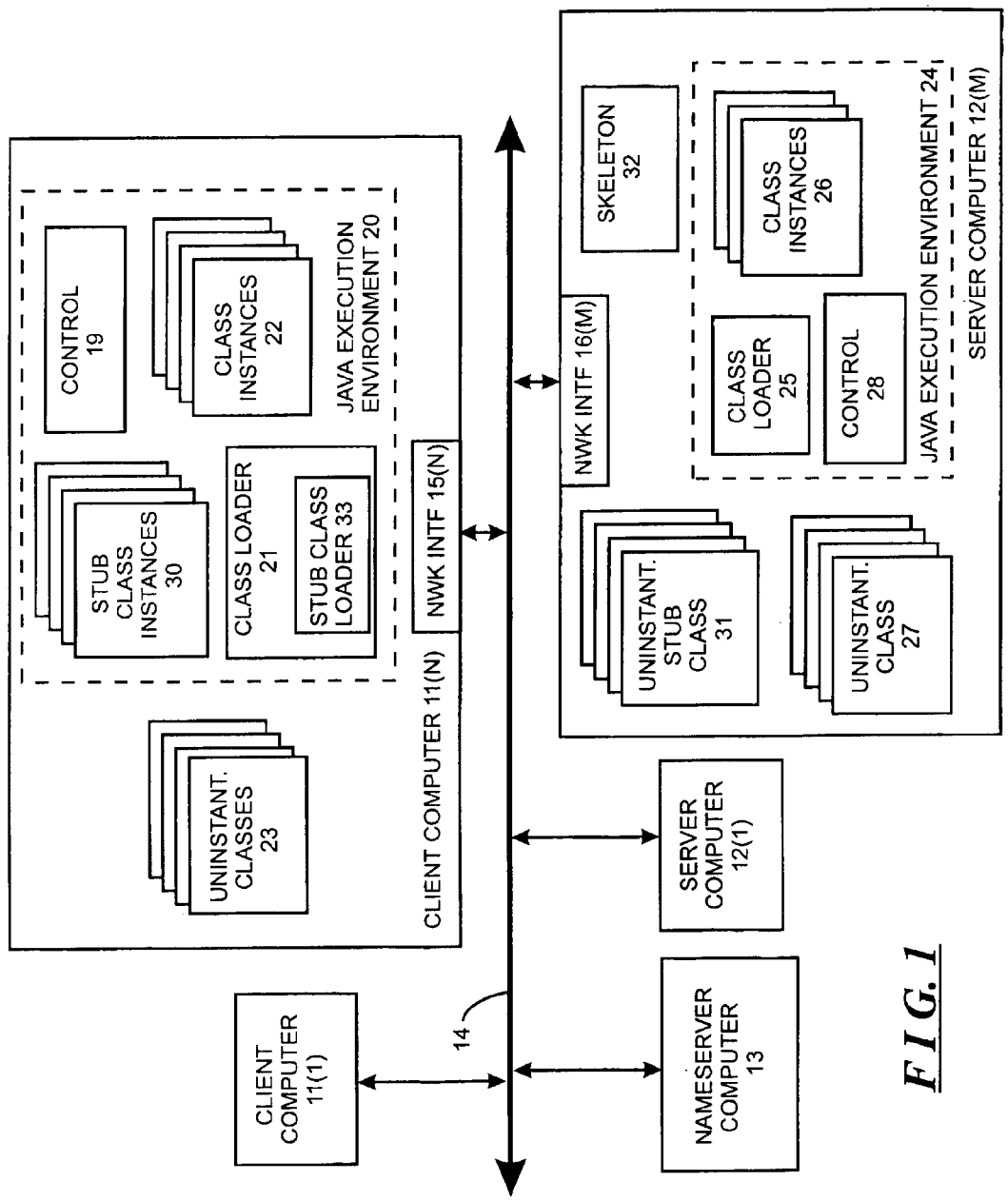
FIG. 1 is a function block diagram of a computer network including an arrangement constructed in accordance with the invention for facilitating the obtaining, dynamic loading and use of "stub" information to enable a program operating in one address space to invoke processing of a remote method or procedure in another address space.

FIG. 1 is a schematic diagram of a computer network 10 including an arrangement for facilitating dynamic loading of "stub" information to enable a program operating in one address space to remotely invoke processing of a method or procedure in another address space. With reference to FIG. 1, computer network 10 includes a plurality of client computers 11(1) through 11(N) (generally identified by reference numeral 11($n$)), a plurality of server computers 12(1) through 12(M) (generally identified by reference numeral 12($m$)), all of which are interconnected by a network represented by a communication link 14. In addition, the network 10 may include at least one nameserver computer 13, which may also be connected to communication link 14, whose purpose will be described below. As is conventional, at least some of the client computers 11($n$) are in the form of personal computers or computer workstations, each of which typically includes a system unit, a video display unit and operator input devices such as a keyboard and mouse (all of which are not separately shown). The server computers 12($m$) and nameserver computer 13 also typically include a system unit (also not separately shown), and may also include a video display unit and operator input devices.

The client computers 11($n$), server computers 12($m$) and nameserver computer 13 are all of the conventional stored-program computer architecture. A system unit generally includes processing, memory, mass storage devices such as disk and/or tape storage elements and other elements (not separately shown), including network interface devices 15($n$), 16($m$) for interfacing the respective computer to the communication link 14. The video display unit permits the computer to display processed data and processing status to the operator, and an operator input device enables the operator to input data and control processing by the computer. The computers 11($n$) and 12($m$) and 13 transfer information, in the form of messages, through their respective network interface devices 15($n$), 16($m$) among each other over the communication link 14.

In one embodiment, the network 10 is organized in a "client-server" configuration, in which one or more computers, shown in FIG. 1 as computers 12($m$), operate as servers, and the other computers, shown in FIG. 1 as computers 11($n$) operate as clients. In one aspect, one or more of the server computers 12($m$) may, as "file servers," include large-capacity mass storage devices which can store copies of programs and data which are available for retrieval by the client computers over the communication link 13 for use in their processing operations. From time to time, a client computer 11($n$) may also store data on the server computer 12, which may be later retrieved by it (the client computer that stored the data) or other client computers for use in their processing operations. In addition, one or more of the server computers 12($m$) may, as "compute servers," perform certain processing operations in response to a remote request therefor from a client computer 11($n$), and return the results of the processing to the requesting client computer 11($n$) for use by them (that is, the requesting client computers 11($n$)) in their subsequent processing. In either case, the server computers may be generally similar to the client computers 11($n$), including a system unit, video display unit and operator input devices and may be usable by an operator for data processing operations in a manner similar to a client computer. Alternatively, at least some of the server computers may include only processing, memory, mass storage and network interface elements for receiving and processing retrieval, storage or remote processing requests from the client computers, and generating responses thereto. It will be appreciated a client computer 11($n$) may also perform operations described herein as being performed by a server computer 12($m$), and similarly a server computer 12($m$) may also perform operations described herein as being performed by a client computer 11($n$).

The network represented by communication link 14 may comprise any of a number of types of networks over which client computers 11($n$), server computers 12($m$) and nameserver computers 13 may communicate, including, for example, local area networks (LANs) and wide area networks (WANs) which are typically maintained within individual enterprises, the public telephony system, the Internet, and other networks, which may transfer digital data among the various computers. The network may be implemented using any of a number of communication media, including, for example, wires, optical fibers, radio links, and/or other media for carrying signals representing information among the various computers depicted in FIG. 1. As noted above, each of the computers typically includes a network interface which connects the respective computer to the communications link 14 and allows it to transmit and receive information thereover.

The invention provides a system for facilitating the obtaining and dynamic loading of "stub" information to enable a program operating in one address space to invoke processing of a remote method or procedure in another address space, which may be located on the same computer as the invoking program or on a different computer. The invention will be described in connection with programs provided in the Java™ programming language, as described in the Java language specification, which are processed in connection with an execution environment which is provided by a Java virtual machine. The Java virtual machine, in turn, is specified in the Java virtual machine specification. As described in the Java language specification, programs in the Java programming language define "classes" and "interfaces." Classes are used to define one or more methods or procedures, each of which may be invoked by reference to an interface. A class may be associated with and extend a "super-class," and in that regard will incorporate all of the interfaces and methods of the super-class, and may also include additional interfaces and/or methods. A class may also have one or more sub-classes (and thus will comprise a super-class of each of its sub-classes), with each sub-class incorporating and possibly extending their respective super-classes.

An interface provides a mechanism by which a set of methods may be declared. In that connection, an interface identifies each method that is declared by the interface by, for example, a name, identifies the data type(s) of argument (s) that are to be provided for the method, the data type(s) of return values that are to be returned by the method, and identifiers for exceptions which can be thrown during processing of the method. A class may indicate that it implements a particular interface, and in that connection will include the program code which will be used in processing all of the methods which are declared in the interface. In addition, different classes may indicate that they implement the same interface, and each will have program code which will be used in processing all of the methods which are declared in the interface, but the program code provided in each class to for use in processing the methods may differ from the program code provided in the other classes which is used in processing the same methods; thus, an interface provides a mechanism by which a set of methods can be declared without providing an indication of the procedure which will be used in processing any of the methods. An interface may be declared independently of the particular class which implements the method or methods which can be invoked using the interface. In that regard, a class that invokes the method and a class that actually implements the method will not need to share a common super-class.

During processing of a Java program, as described in the Java virtual machine specification, a client computer 11(n) provides an execution environment 20 for interpreting the Java program. The Java virtual machine includes a class loader 21 that, under control of a control module 19, can dynamically link instances of classes, generally identified in FIG. 1 by reference numeral 22, into the running program's execution environment while the program is being executed. In that operation, the control module 19 effectively enables the class loader to retrieve uninstantiated classes, which generally identified by reference numeral 23, instantiate them and link them as class instances 22 into the execution environment's address space at the Java program's run time as the methods which the respective classes 23 implement are called. In addition, the class loader 21 can discard ones of the class instances 22 when they are not needed or to conserve memory. It will be appreciated that, if a class instance 22 has been discarded, it may be reloaded by the class loader 21 at a later point if it is then needed.

The invention provides an arrangement which facilitates the remote invocation, by a program executing in an execution environment 20 by a client computer 11(n), of methods implemented by classes on a server computer 12(m). In executing a method, the server computer 12(m) will also provide an execution environment 24 for processing, under control of a control module 28, the Java method. In that operation, the Java virtual machine which provides the execution environment 21 includes a class loader 25 (which may be similar to the class loader 21) that, under control of the control module 28, can dynamically link an instance of the class 26, to enable the method to be processed in the execution environment 24, and instances of other classes (also generally represented by reference numeral 26) which may be needed to process the remotely-invoked method. In that operation, the control module 28 effectively enables the class loader 25 to retrieve an uninstantiated class for the method to be invoked, from a plurality of uninstantiated classes which are generally identified by reference numeral 27, instantiate it (that is, the uninstantiated class which provides the method to be invoked) and link it as a class instance 26 into the execution environment. In addition, the class loader 25 can discard the class instances 26 when processing of the method has terminated. It will be appreciated that, if class instances 26 has been discarded, it may be reloaded by the class loader 25 at a later point if it is then needed.

The structure of nameserver computer 13, if provided, is generally similar to that of the server computer 12(m), and will not be separately described.

To facilitate remote invocation of a method, the control module 19 of the client computer's execution environment 21 makes use of one or more stub class instances generally identified by reference numeral 30 which are provided as part of the execution environment 21 in which the various class instances 22, including the class instance which is invoking the remote method, are being processed. Each stub class instance 30 is an instance of an uninstantiated stub class 31, which the server computer 12(m) may maintain for the various class instances 26 and uninstantiated classes 27 which the server computer 12(m) has "exported," that is, which the server computer 12(m) makes available to client computers 11(n) for use in remote invocation of methods provided thereby. An uninstantiated stub class 31 includes declarations for the complete set of interfaces for the particular remote uninstantiated class 27 which implements the remote method to be invoked, and also provides or invokes methods which facilitate accessing of the remote method(s) which are implemented by the remote class. The uninstantiated stub class 31, when it is instantiated and provided to the execution environment 20 of the client computer 11(n) as a stub class instance 30, effectively provides the information which is needed by the control module 19 of the execution environment 20 of the invoking Java program, so that, when a remote method that is implemented by its associated class is invoked by a Java program running in a particular execution environment, the remote method will be processed and the return value(s) provided to the invoking Java program. In one embodiment, the arrangement by which the stub class instance may be provided to the execution environment 20 is similar to that described in the aforementioned Waldo, et al., patent application.

In addition, the server computer 12(m) provides a skeleton 32, which identifies the particular classes and methods which have been exported by the server computer 12(m) and information as to how it (that is, the server computer 12(m)) may load the respective classes and initiate processing of the particular methods provided thereby.

When a class instance invokes a remote method maintained by a server computer 12(m), it will provide values for various parameters to the stub class instance 30 for the remote method, which values the remote method will use in its processing. If the remote method is implemented on the same computer as the invoking Java program, when the invoking Java program invokes a remote method, the computer may establish an execution environment, similar to the execution environment 20, enable the execution environment's class loader to load and instantiate the class which implements the method as a class instance similar to class instances 22, and process the remote method using values of parameters which are provided by the invoking class instance in the remote invocation. After processing of the method has been completed, the execution environment in which the remote method has been processed will provide the results to the stub class instance 30 for the remote method that was invoked, which, in turn, will provide to the particular class instance 22 which invoked the remote method.

Similar operations will be performed if client computer 11(n) and server computer 12(m) are implemented on different physical computers. In that case, in response to a remote invocation, the client computer 11(n) that is processing the invoking class instance 22, under control of the control module 19 for the execution environment 10 for the invoking class instance 22, will use the appropriate stub class instance 30 to communicate over the network represented by the communication link 14 with the server computer 12(m) which implements the remote method to enable it (that is, the server computer 12(m)) to establish an execution environment 24 for the class which implements the remote method, and to use the class loader 25 to load an instance of the class as a class instance 26. In addition, the client computer 11(n), also using the appropriate stub class instance 30, will provide any required parameter values to the server computer 12(m) over the network 14. Thereafter, the server computer 12(m) will process the remote method using parameter values so provided, to generate result value (s) which are transferred over the network to the client computer 11(n), in particular to the appropriate stub class instance 30. The client computer 11(n) will, after it receives the result value(s) from the network, provide them to the invoking class instance 22 for its processing.

In any case, when the control module 19 of the client computer's execution environment 20 determines that a reference to the remote object has been received, if it determines that the stub class instance 30 is not present when it receives the reference, it will attempt to obtain the stub class instance 30 from, for example, the server computer 12(m) which implements the remote method, and enable the stub class instance 30 to be dynamically loaded in the execution environment 20 for the invoking class instance 22. A reference to the remote object may be received, for example, either as a return value of another remote method invocation or as a parameter that is received during another remote method invocation. The stub class instance may be dynamically loaded into the execution environment in a manner similar to that used to load class instances 22 in the execution environment 22. The execution environment 20 is provided with a stub class loader 33 which, under control of the control module 19, will attempt to find and load the stub class instances 30 as required by the class instances 22 processed in the execution environment. The location of a particular server computer 12(m) that maintains the class that implements a method to be invoked remotely may be included in the call from the invoking class instance or may be made known to the stub class loader 33 through raw another mechanism (not shown) maintained by the client computer 11(n).

However, if the stub class loader 33 is not otherwise notified of which server computer 12(m) maintains the class which implements a method which may be invoked remotely, it may use the nameserver computer 13 to provide that identification. The identification may comprise any identifier which may be used to identify a server computer 12(m) or other resource which is available on the network 14 and to which the server computer 12(m) can respond. Illustrative identifiers include, for example, a network address which identifies the server computer and/or resource, or, if the network 14 is or includes the Internet, an identifier to, for example, a World Wide Web resource which may provide the identification or a "uniform resource locator" ("URL") which provides a uniform mechanism for identifying resources that are available over the Internet. The server computer 12(m) which implements the remote method, in response to a request from the client computer 11(n) will provide stub class instance 30 which the client computer 11(n) may load into the execution environment 21 to thereafter enable the remote invocation to be initiated.

As noted above, if the stub class loader 33 does not know which server computer 12(m) implements the remote method which may be invoked (and thus does not know which computer is to provide the stub class code for the remote invocation), it may, under control of the control module 19, obtain the identification from the nameserver computer 13. In that operation, the stub class loader 33 may use a previously-provided default stub class which is provided for use in such cases. The default class stub, when used by the invoking Java program, enables the computer that is processing the invoking Java program to communicate with the nameserver computer 13 to obtain information which can be used in invoking the remote method. This operation is essentially the same as the invocation of a remote method to be processed by the nameserver computer 13, with the remote method including a parameter identifying the class and method to be remotely invoked, and enabling the nameserver computer 13 to provide the identification of a server computer 12(m) which can process the method to the requesting client computer 11(n) and other information which may be helpful in communicating with the server computer 12(m) and invoking the particular method. It will be appreciated that the nameserver computer 13 will maintain a table (not separately shown) of "exported" resources, that is, resources, such as classes and methods, that are available to client computers 11(n) connected to the network 14, and information, such as the identifications of the particular server computers 12(m) which provide those resources, which will be useful to the client computers 11(n) in making use of the exported resources.

It will be appreciated that the nameserver computer 13 may create and maintain the exported resource table in a number of ways that are known in the art. For example, the nameserver computer 13 may periodically broadcast requests for exported resource information over the network 14, to which the various server computers 12(m) which maintain exported resources may respond; in that case, the nameserver computer 13 may establish its exported resource table based on the responses from the server computers 12(m). Alternatively, each of the various server computers 12(m) which maintains an exported resource may periodically broadcast information as to the exported resources which it maintains, and the nameserver computer 13 can update its exported resource table based on the broadcasts from the server computer. In addition, the nameserver computer's exported resource table may be established by a system operator and may be fixed until he or she updates it.

In any case, the information provided by the nameserver computer 13 in response to a request initiated by the default stub would include such information as, for example, the identification of a computer 12(m) which can provide a class which implements the remote method to be invoked, particular information which the computer (that is, the computer which implements the remote method) will require to provide the required stub class code, and the like. After receiving the information from the nameserver computer 13, the computer 11(n) that is processing the invoking Java program may, under control of the control module 19, use the information communicate with the computer (that is, the computer which implements the remote method) to obtain the stub class, and may thereafter invoke the method as described above.

Figure 2A:
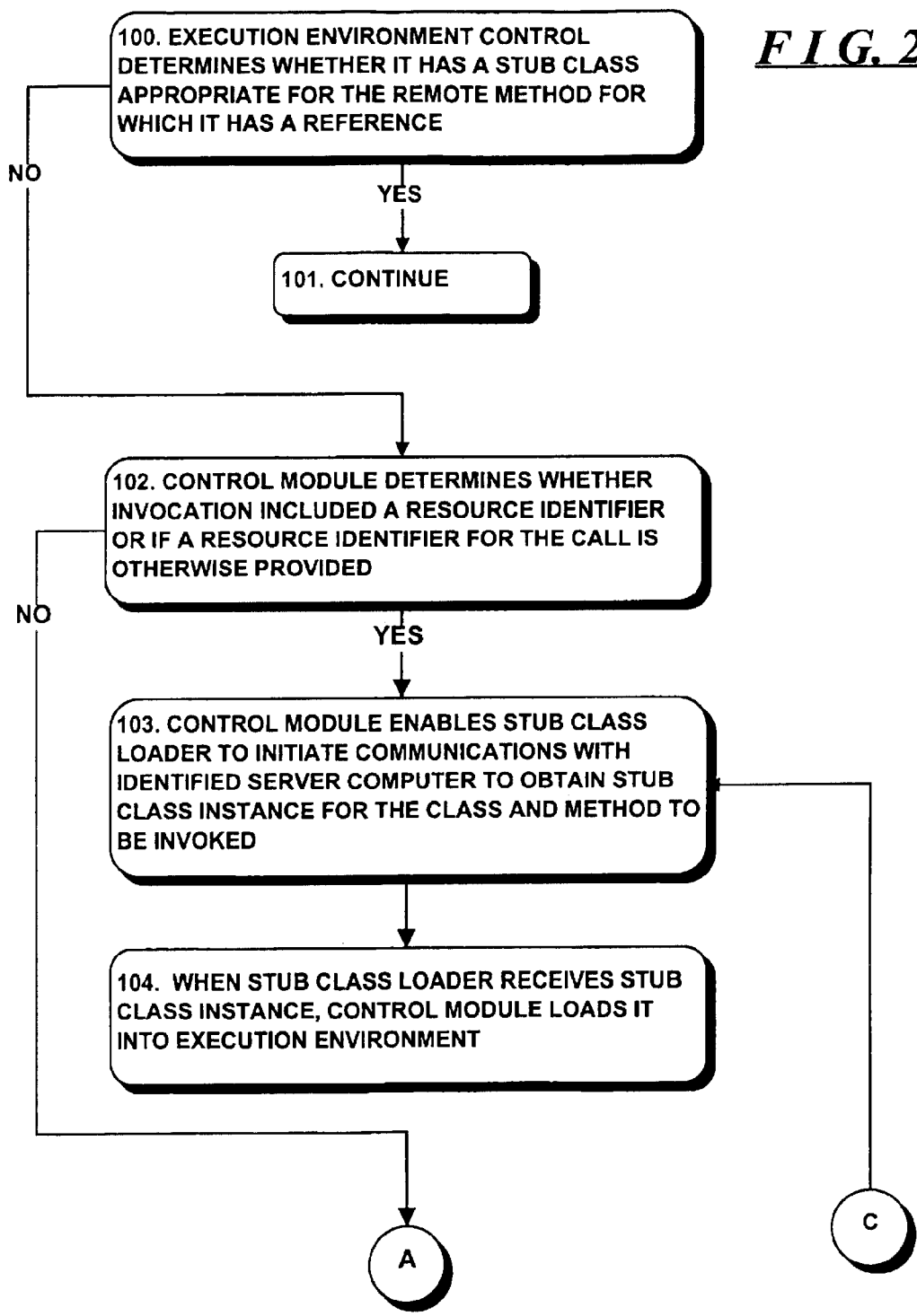
FIGS. 2A through 3B are flow charts depicting the operations performed by the arrangement depicted in FIG. 1, which is useful in understanding the invention, with FIGS. 2A through 2C depicting operations performed in connection with obtaining and dynamic loading of the stub information and FIGS. 3A and 3B depicting operations performed in connection with use of the stub information to invoke processing of the remote method or procedure.
Figure 2C:
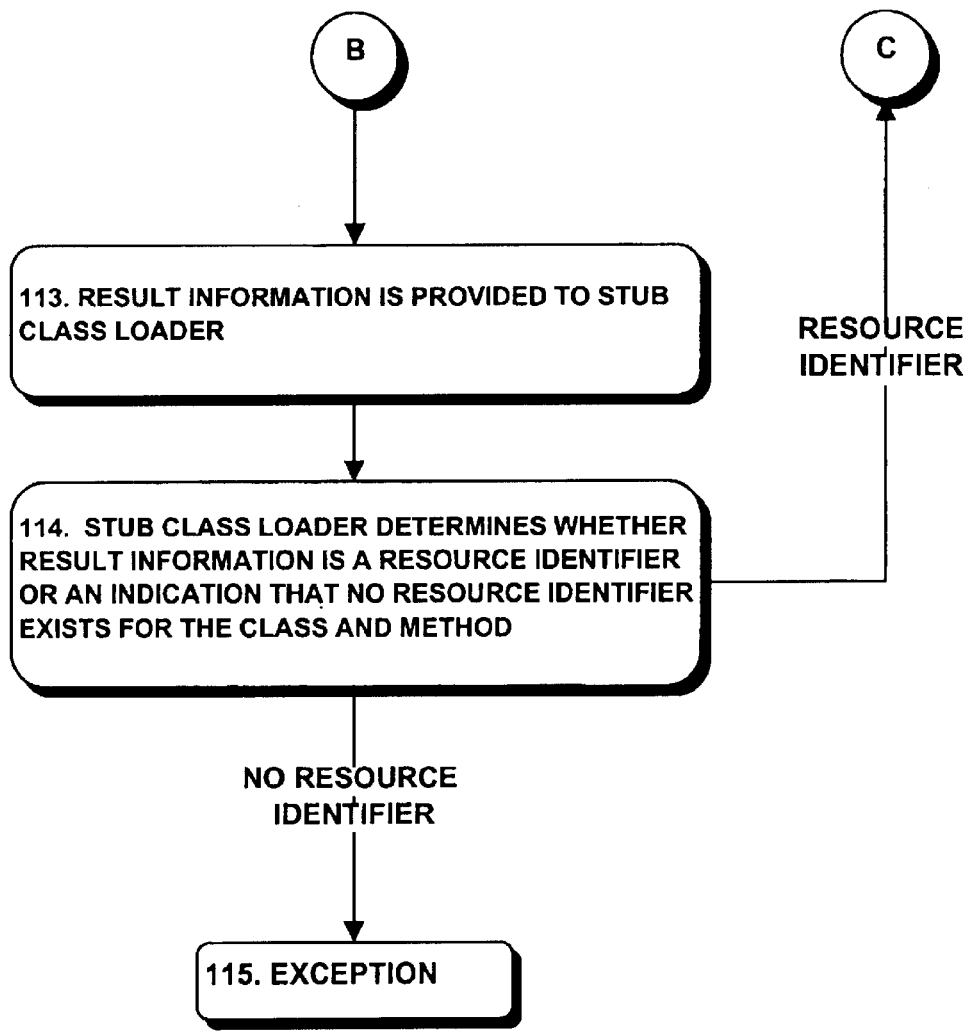
Figure 3A:
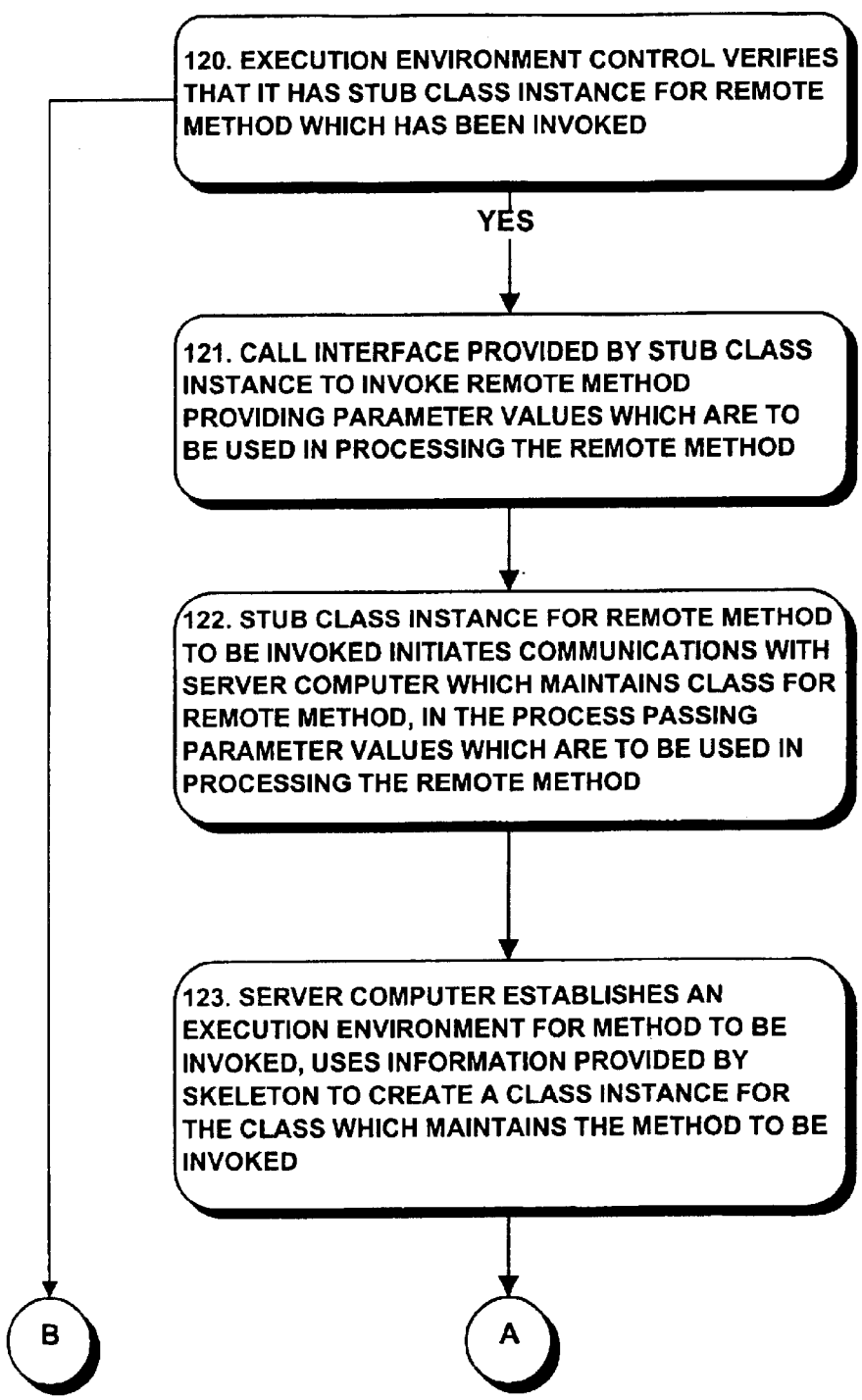

With this background, the operations performed by client computer 11(*n*), server computer 12(*m*) and, if necessary, nameserver 13 in connection with obtaining and dynamic loading of a stub class instance when a reference to a remote method is received will be described in connection with the flow chart depicted in FIGS. 2A through 2C In addition, operations performed by the client computer 11(*n*) and server computer in connection with remote invocation of a method using the stub class instance will be described in connection with the flow chart depicted in FIGS. 3A and 3B With reference initially to FIG. 2A, the execution environment control module 19 will, when it receives a reference to a remote method, will initially determine whether an appropriate stub class instance is present in the execution environment 20 to facilitate invocation of the remote method (step 100). If the control module 19 determines that such a stub class instance 30 for the remote method is present in the execution environment, it may continue other operations (step 101). However, if the control module 19 determines in step 101 that such a stub class instance is not present in the execution environment 20 for the remote method, the control module 19 will use the stub class loader 33 to attempt to locate and load a stub class instance 30 for the class to process the remote method. In that case, the control module 19 will initially determine whether the invocation from the class instance 22 included a resource locator to identify the server computer 12(*m*) or other resource which maintains the class for the method to be invoked, or whether it (that is, the control module 19) or the stub class loader 33 otherwise are provided with such a resource locator (step 102). If the control module 19 makes a positive determination in that step, it will sequence to step 103 to enable the stub class loader 33 to initiate communications with identified server computer 12(*m*) to obtain stub class instance for the class and method to be invoked (step 103). When the stub class loader 33 receives the stub class instance 30 from the server computer 12(*m*), it will load the stub class instance 30 into execution environment 20 for the class instance 21 which initiated the remote method invocation call in step 100 (step 104). After the stub class instance 30 for the referenced remote method has been loaded in the execution environment, the method can be invoked as will be described below in connection with FIGS. 3A and 3B.

Returning to step 102, if the control module 19 determines that the invocation from the class instance 22 did not include a resource locator to identify the server computer 12(*m*) or other resource which maintains the class for the method to be invoked, and further that it (that is, the control module 19) or the stub class loader 33 is not otherwise provided with such a resource locator, a "class not found" exception may be indicated, at which point the control module 19 may call an exception handler. The exception handler may perform any of a number of recovery operations, including, for example, merely notifying the control module 19 that the remote method could not be located and allow it to determine subsequent operations.

Alternatively, the control module 19 may attempt to obtain a resource locator from the nameserver computer 13 or other resource provided by the network 14 (generally represented in FIG. 1 by the nameserver computer 13), using a call to, for example, a default stub class instance 30. The call to the default stub class instance 30 will include an identification of the class and method to be invoked and the name of the nameserver computer 13(*m*). Using the default stub class instance 30, the control module 19 will enable the computer 11(*n*) to initiate communications with nameserver computer 13 to obtain an identifier for a server computer 12(*m*) which maintains the class and method to be invoked (step 110). The communications from the default stub class instance 30 will essentially correspond to a remote method invocation, with the method enabling the nameserver computer to provide the identification for the server computer 12(*m*), if one exists associated with the class and method to be remotely invoked, or alternatively to provide an indication that no server computer 12(*m*) is identified as being associated with the class and method. During the communications in step 110, the default stub class interface 30 will provide, as a parameter value, the identification of class and method to be invoked.

In response to the communications from the default stub class instance 30, the nameserver computer 13 will process the request as a remote method (step 111), with the result information comprising the identification for the server computer 12(*m*), if one exists that is associated with the class and method to be remotely invoked, or alternatively an indication that no server computer 12(*m*) is identified as being associated with the class and method. After finishing the method, the nameserver computer 13 will initiate communications with the default stub class instance 30 to provide the result information to the default stub class instance 30 (step 112).

After receipt of the result information from the nameserver computer 13, the default stub class instance, under control of the control module 19, will pass result information to the stub class loader 33 (step 113). Thereafter, the stub class loader 33 determines whether the result information from the nameserver computer comprises the identification for the server computer 12(*m*) or an indication that no server computer 12(*m*) is identified as being associated with the class (step 114). If the stub class loader 33 determines that the result information comprises the identification for the server computer 12(*m*), it (that is, the stub class loader 33) will return to step 101 to initiate communication with the identified server computer 12(*m*) to obtain stub class instance for the class and method that may be invoked. On the other hand, if the stub class loader 33 determines in step 114 that the nameserver computer 13 had provided an indication that no server computer 12(*m*) is identified as being associated with the class and method that may be invoked, the "class not found" exception may be indicated (step 115) and an exception handler called as described above.

As noted above, the stub class instance 30 retrieved and loaded as described above in connection with FIGS. 2A through 2C may be used in remote invocation of the method. Operations performed by the client computer 11(*n*) in connection with remote invocation of the method will be described in connection with the flow chart in FIGS. 3A and 3B As depicted in FIG. 3A, when a class instance 22 invokes a method, the control module 19 may initially verify that a stub class instance 30 is present in the execution environment for remote method to be invoked (step 120). If a positive determination is made in step 120, the stub class instance 30 will be used for the remote invocation, and in the remote invocation will provide parameter values which are to be used in processing the remote method (step 121). Thereafter, the stub class instance 30 for the remote method that may be invoked will be used to initiate communications with the server computer 12(*m*) which maintains the class for the remote method (step 122), in the process, the passing parameter values which are to be used in processing the remote method will be passed. It will be appreciated that, if the server computer 12(m) which is to process the method is the same physical computer as the client computer 12(n) which is invoking the method, the communications can be among execution environments which are being processed within the physical computer. On the other hand, if the server computer 12(m) which is to process the method is a different physical computer from that of the client computer 12(n) which is invoking the method, the communications will be through the client computer's and server computer's respective network interfaces 15(n) and 16(m) and over the network 14.

In response to the communications from the stub class instance in step 122, the server computer 12(m), if necessary establishes an execution environment 24 for the class which maintains the method that may be invoked, and the uses the information provided by the skeleton 32 to create a class instance 26 for that class (step 123). Thereafter, the server computer 12(m), under control of the control module 28, will process the method in connection with parameter values that were provided by stub class instance 30 (step 124). After completing processing of the method, the server computer 12(m), also under control of the control module 28, will initiate communications with the client computer's stub class instance 30 to provide result information to the stub class instance (step 125). In a manner similar to that described above in connection with step 102, if the server computer 12(m) which processed the method is the same physical computer as the client computer 12(n) which invoked the method, the communications can be among execution environments 24 and 20 which are being processed within the physical computer. On the other hand, if the server computer 12(m) which processed the method is a different physical computer from that of the client computer 12(n) which is invoking the method, the communications will be through the server computer's and client computers respective network interfaces 16(m) and 15(n) and over the network 14. After the stub class instance 30 receives the result information from the server computer, it may provide result information to the class instance 22 which initiated the remote method invocation (step 126), and that class instance 22 can continue processing under control of the control module 19.

Returning to step 120, if the control module 19 determines in that step that it does not have a stub class instance 30 that is appropriate for the remote method that may be invoked, it may at that point call an exception handler (step 127) to perform selected error recovery operations.

The invention provides a number of advantages. In particular, it provides a new system and method for facilitating dynamic loading of a stub which enables a program that is operating in one execution environment to remotely invoke processing of a method in another execution environment, so that the stub can be loaded by the program when it is run and needed. In systems in which stubs are compiled with the program, and thus are statically determined when the program is compiled, they (the stubs) may implement subsets of the actual set of remote interfaces which are supported by the remote references that is received by the program, which can lead to errors and inefficiencies due to mismatches between the stub that is provided to a program and the requirements of the remote procedure that is called when the program is run. However, since, in the dynamic stub loading system and method, the stub that is loaded can be obtained from the particular resource which provides the remote method, it (the stub) can define the exact set of interfaces to be provided to the invoking program at run time, thereby obviating run-time incompatibilities which may result from mismatches between the stub that is provided and the requirements of the remote method that is invoked.

It will be appreciated that a number of modifications may be made to the arrangement as described above. For example, although the execution environment 20 has been described as obtaining and loading stub class instances to facilitate invocation of remote methods when references to the remote methods are received, it will be appreciated that stub class instances may instead be obtained and loaded when the remote methods are initially invoked. Obtaining and loading of the stub class instance for a remote method when a reference thereto is received will have the advantages that (i) the stub class instance will be present in the execution environment when the remote method is actually invoked, and (ii) if the appropriate stub class instance can not be located, the program or an operator may be notified at an early time. On the other hand, obtaining and loading of the stub class instance for a remote method when the method is to be invoked may result in a delay of the invocation until the correct stub class instance can be found, if the method is in fact not invoked even if a reference to it is received the stub class instance may not need to be located and loaded.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system to may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. For use in connection with a remote method invocation system, a stub retrieval and loading subsystem for controlling the retrieval and loading of a stub of a remote method into an execution environment to facilitate invocation of the remote method by a program executing in said execution environment, the stub retrieval subsystem comprising:

A. a stub retriever configured to initiate a retrieval of said stub from a server associated with processing of said remote method, said stub used to facilitate remote invocation of said remote method; and B. a stub loader configured to, after said stub is received by said stub retriever from said server, load said stub into said execution environment, thereby to make the stub available for use in said remote invocation of said remote method.

2. A stub retrieval and loading subsystem as defined in claim 1 further including a remote method reference detector configured to detect whether a remote method reference has been received in said execution environment, the stub retriever being further configured to initiate retrieval of said stub when the remote method reference detector detects that a remote method reference has been received in said execution environment.

3. A stub retrieval and loading subsystem as defined in claim 1 further including a remote method invocation control configured to control invocation of said remote method, said stub retriever being further configured to initiate retrieval of said stub code when the remote method is invoked.

4. A stub retrieval and loading subsystem as defined in claim 1, the remote method invocation system further including the server, the server being configured to process said remote method in response to a processing request therefore, the server further being configured to provide said stub in response to a retrieval request from said stub retriever.

5. A stub retrieval and loading subsystem as defined in claim 4 in which server is configured to provide a separate address space for processing said remote method from an address space provided by said execution environment.

6. A stub retrieval and loading subsystem as defined in claim 5 in which the address space provided by said server and the address space provided by said execution environment are provided by separate computers.

7. A stub retrieval and loading subsystem as defined in claim 4, further comprising a remote server identifier configured to provide a server identification for identifying said server.

8. A stub retrieval and loading subsystem as defined in claim 7 further including a remote method reference detector configured to detect whether a remote method reference has been received in said execution environment, the remote method reference including a remote method server identifier configured to use the remote method server identifier as the server identification.

9. A stub retrieval and loading subsystem as defined in claim 7 further including a remote method invocation control configured to provide a remote method invocation identification for controlling invocation of said remote method, the remote method invocation providing a remote method server identifier, the remote server identifier using the remote method server identifier as the server identification.

10. A stub retrieval and loading subsystem as defined in claim 7, the remote method invocation system further including a nameserver configured to provide a said server identification, said remote server identifier initiating communication with said nameserver to obtain the server identification for said remote method.

11. A stub retrieval and loading method for controlling the retrieval and loading of a stub of a remote method into an execution environment to facilitate invocation of the remote method by a program executing in said execution environment, the stub retrieval method comprising the steps of:
  A. initiating a retrieval of said stub from a server associated with processing of said remote method, said stub used to facilitate remote invocation of said remote method; and
  B. after said stub is received from said server, loading said stub into said execution environment, thereby to make the stub available for use in said remote invocation of said remote method.

12. A stub retrieval and loading method as defined in claim 11 further including the step of detecting whether a remote method reference has been received in said execution environment, and wherein the initiating step includes the step of initiating retrieval of said code when a remote method reference has been received in said execution environment.

13. A stub retrieval and loading method as defined in claim 11 further including the step of controlling invocation of said remote method, and wherein the initiating step includes the step of initiating retrieval of said stub when the remote method is invoked.

14. A stub retrieval and loading method as defined in claim 11, further including the steps of enabling the server to process said remote method in response to a processing request therefore, and enabling the server to provide said stub in response to a retrieval request from said stub retriever.

15. A stub retrieval and loading method as defined in claim 14 in which said server provides a separate address space for processing said remote method from an address space provided by said execution environment.

16. A stub retrieval and loading method as defined in claim 15 in which the address space provided by said server and the address space provided by said execution environment are provided by separate computers.

17. A stub retrieval and loading method as defined in claim 14, further including the step of providing a server identification for identifying said server.

18. A stub retrieval and loading method as defined in claim 17 further including the step of detecting whether a remote method reference has been received in said execution environment, the remote method reference including a remote method server identifier, the remote method server identifier being used as the server identification when detecting whether the remote method reference has been received.

19. A stub retrieval and loading method as defined in claim 17 further including the step of providing a remote method invocation identification for controlling invocation of said remote method, the remote method invocation providing a remote method server identifier, the remote method server identifier being used as the server identification when controlling invocation of said remote method.

20. A stub retrieval and loading subsystem as defined in claim 17, further including a nameserver for providing said server identification, said remote server identifier initiating communication with said nameserver to obtain the server identification for said remote method.

21. For use in connection with a remote method invocation method, a stub retrieval and loading computer program product for controlling a computer to, in turn, control the retrieval and loading of a stub of a remote method into an execution environment to facilitate invocation of the remote method by a program executing in said execution environment, the stub retrieval computer program product comprising a computer-readable medium having encoded thereon:
  A. stub retriever code configured to enable said computer to initiate a retrieval of said stub from a server associated with processing of said remote method, said stub used to facilitate remote invocation of said remote method; and
  B. stub loader code configured to enable said computer to, after said stub is received from said server, load said stub into said execution environment, thereby to make the stub available for use in said remote invocation of said remote method.

22. A stub retrieval and loading computer program product as defined in claim 21 further including remote method reference detector code configured to enable said computer to detect whether a remote method reference has been received in said execution environment, the stub retriever code being configured to enable said computer to initiate retrieval of said stub when the remote method reference detector code enables said computer to detect that a remote method reference has been received in said execution environment.

23. A stub retrieval and loading computer program product as defined in claim 21 further including remote method invocation control code configured to enable said computer to control invocation of said remote method, said stub retriever code being configured to enable said computer to initiate retrieval of said stub when the remote method is invoked.

24. A stub retrieval and loading computer program product as defined in claim 21, the remote method invocation system further including the server, the server being configured for processing said remote method in response to a processing request therefore, the server further configured to provide said stub in response to a retrieval request from said computer.

25. A stub retrieval and loading computer program product as defined in claim 24 in which said server is configured to provide a separate address space for processing said remote method from an address space provided by said execution environment.

26. A stub retrieval and loading computer program product as defined in claim 25 in which the address space provided by said server and the address space provided by said execution environment are provided by separate computers.

27. A stub retrieval and loading computer program product as defined in claim 24, further comprising remote server identifier code configured to enable said computer to provide a server identification for identifying said server.

28. A stub retrieval and loading computer program product as defined in claim 27 further including remote method reference detector code for enabling said computer to detect whether a remote method reference has been received in said execution environment, the remote method reference including a remote method server identifier, the remote server identifier code enabling said computer to use the remote method server identifier as the server identification.

29. A stub retrieval and loading computer program product as defined in claim 27 further including remote method invocation control code configured to enable said computer to provide a remote method invocation identification for controlling invocation of said remote method, the remote method invocation providing a remote method server identifier, the remote server identifier code being configured to enable said computer to use the remote method server identifier as the server identification.

30. A stub retrieval and loading computer program product as defined in claim 27, the remote method invocation system further including a nameserver configured to provide a said server identification, said remote server identifier code being configured to enable said computer to initiate communication with said nameserver to obtain the server identification for said remote method.

31. For use in connection with a remote method invocation system, a stub retrieval and loading subsystem for controlling the retrieval and loading of a stub of a remote method into an execution environment to facilitate invocation of the remote method by a program executing in said execution environment, the stub retrieval subsystem comprising:

A. a computer; and

B. a control arrangement configured to control said computer, said control arrangement comprising:
  i. a stub retrieval module configured to control said computer to initiate a retrieval of said stub from a server associated with processing of said remote method, said stub used to facilitate remote invocation of said remote method; and
  ii. a stub loader module configured to control said computer to, after said stub is received from said server in response to said stub retrieval module, load said stub into said execution environment, thereby to make the stub available for use in said remote invocation of said remote method.

32. A control arrangement for use in connection with a computer to control the retrieval and loading of a stub of a remote method into an execution environment to facilitate invocation of the remote method by a program executing in said execution environment, said control arrangement comprising:

i. a stub retrieval module configured to control said computer to initiate a retrieval of said stub from a server associated with processing of said remote method, said stub used to facilitate remote invocation of said remote method; and
  ii. a stub loader module configured to control said computer to, after said stub is received from said server in response to said stub retrieval module, load said stub into said execution environment, thereby to make the stub available for use in said remote invocation of said remote method.

33. A system for distributing code stored on a computer readable medium and executable by a computer, the code including a plurality of modules each configured to control the computer to facilitate the retrieval and loading of a stub of a remote method into an execution environment to facilitate invocation of the remote method by a program executing in said execution environment, said system comprising:

i. a stub retrieval module configured to control said computer to initiate a retrieval of said stub from a server associated with processing of said remote method, said stub used to facilitate remote invocation of said remote method; and
  ii. a stub loader module configured to control said computer to, after said stub code is received from said server in response to said stub retrieval module, load said stub into said execution environment, thereby to make the stub available for use in said remote invocation of said remote method.

* * * * *